(12) United States Patent
Anagnostopoulos et al.

(10) Patent No.: US 12,270,153 B2
(45) Date of Patent: Apr. 8, 2025

(54) STARCH-CELLULOSE COMPOSITE MATERIAL

(71) Applicant: Pratt Corrugated Holdings, Inc., Brookhaven, GA (US)

(72) Inventors: John Anagnostopoulos, Atlanta, GA (US); Greg Sollie, Sharpsburg, GA (US); Jamie Waltermire, Peachtree City, GA (US); Shifeng Chen, Newport News, VA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

(21) Appl. No.: 17/666,206

(22) Filed: Feb. 7, 2022

(65) Prior Publication Data

US 2022/0251783 A1   Aug. 11, 2022

Related U.S. Application Data

(60) Provisional application No. 63/148,474, filed on Feb. 11, 2021.

(51) Int. Cl.
*D21F 11/00* (2006.01)
*B29B 7/90* (2006.01)
(Continued)

(52) U.S. Cl.
CPC .............. *D21F 11/002* (2013.01); *B29B 7/90* (2013.01); *B29C 69/001* (2013.01); *D21H 17/09* (2013.01);
(Continued)

(58) Field of Classification Search
CPC ....... D21F 11/002; B29B 7/90; B29C 69/001; D21H 17/09; D21H 17/15; D21H 17/22; D21H 17/26; D21H 17/28; D21H 17/31; D21H 17/36; D21H 17/66; D21H 17/74; D21H 21/08; D21H 23/64; B29K 2105/04; B29K 2201/00
See application file for complete search history.

(56) References Cited

U.S. PATENT DOCUMENTS

| 265,985 A | 10/1882 | Seabury |
| 1,061,531 A | 5/1913 | Emmons |

(Continued)

FOREIGN PATENT DOCUMENTS

| AU | 2021204424 | 7/2023 |
| AU | 2021245201 | 4/2024 |

(Continued)

OTHER PUBLICATIONS

US 10,562,676 B2, 02/2020, Waltermire et al. (withdrawn)
(Continued)

*Primary Examiner* — Jacob T Minskey
*Assistant Examiner* — Stephen M Russell
(74) *Attorney, Agent, or Firm* — Taylor English Duma LLP

(57) ABSTRACT

A composite can include cellulose fiber; and foam binding the cellulose fiber. A method for manufacturing a composite can comprise mixing a plurality of ingredients to form a pre-foam mixture; foaming the pre-foam mixture to produce a foam; mixing the foam with cellulose fiber to form a composite material; and curing the composite material.

17 Claims, 9 Drawing Sheets

(51) Int. Cl.
  *B29C 69/00* (2006.01)
  *D21H 17/00* (2006.01)
  *D21H 17/09* (2006.01)
  *D21H 17/15* (2006.01)
  *D21H 17/22* (2006.01)
  *D21H 17/26* (2006.01)
  *D21H 17/28* (2006.01)
  *D21H 17/31* (2006.01)
  *D21H 17/36* (2006.01)
  *D21H 17/66* (2006.01)
  *D21H 21/08* (2006.01)
  *D21H 23/64* (2006.01)
  *B29K 105/04* (2006.01)
  *B29K 201/00* (2006.01)

(52) U.S. Cl.
  CPC ............ *D21H 17/15* (2013.01); *D21H 17/22* (2013.01); *D21H 17/26* (2013.01); *D21H 17/28* (2013.01); *D21H 17/31* (2013.01); *D21H 17/36* (2013.01); *D21H 17/66* (2013.01); *D21H 17/74* (2013.01); *D21H 21/08* (2013.01); *D21H 23/64* (2013.01); *B29K 2105/04* (2013.01); *B29K 2201/00* (2013.01)

(56) References Cited

U.S. PATENT DOCUMENTS

| | | |
|---|---|---|
| 1,150,105 A | 8/1915 | Emmons |
| 1,527,167 A | 2/1925 | Birdseye |
| 1,601,547 A | 9/1926 | Wofford |
| 1,677,565 A | 7/1928 | Oppenheim |
| 1,682,410 A | 8/1928 | Oppenheim |
| 1,747,980 A | 2/1930 | Kondolf |
| 1,753,813 A | 4/1930 | Washburn |
| 1,792,627 A | 2/1931 | Bowersock |
| 1,868,996 A | 7/1932 | Sharp |
| 1,896,393 A | 2/1933 | Devine |
| 1,899,892 A | 2/1933 | D'Este et al. |
| 1,930,680 A | 10/1933 | Hinton |
| 1,935,923 A | 11/1933 | Thoke |
| 1,937,263 A | 11/1933 | Bubb |
| 1,942,917 A | 1/1934 | D'Este et al. |
| 1,954,013 A | 4/1934 | Lilienfeld |
| 2,018,519 A | 10/1935 | Hall |
| 2,070,747 A | 2/1937 | Ostrom |
| 2,116,513 A | 5/1938 | Frankenstein |
| 2,148,454 A | 2/1939 | Gerard |
| 2,165,327 A | 7/1939 | Zalkind |
| 2,289,060 A | 7/1942 | Merkle |
| 2,293,361 A | 8/1942 | Roberts |
| 2,326,817 A | 8/1943 | Zalkind |
| 2,360,806 A | 10/1944 | Rosen |
| 2,386,905 A | 10/1945 | Meitzen |
| 2,389,601 A | 11/1945 | Witt |
| 2,485,643 A | 10/1949 | Norquist |
| 2,554,004 A | 5/1951 | Bergstein |
| 2,632,311 A | 3/1953 | Sullivan |
| 2,650,016 A | 8/1953 | McMillan |
| 2,753,102 A | 7/1956 | Paige |
| 2,761,610 A | 9/1956 | Welshenbach |
| 2,867,035 A | 1/1959 | Patterson, Jr. |
| 2,899,103 A | 8/1959 | Ebert |
| 2,927,720 A | 3/1960 | Adams |
| 2,950,225 A | 8/1960 | Losse |
| 2,954,913 A | 10/1960 | Rossman |
| 2,979,246 A | 4/1961 | Liebeskind |
| 2,986,324 A | 5/1961 | Anderson, Jr. |
| 2,987,239 A | 6/1961 | Atwood |
| 3,003,622 A | 10/1961 | Hardigg |
| 3,003,680 A | 10/1961 | Wilcox, Jr. et al. |
| 3,024,935 A | 3/1962 | Mnick |
| 3,029,008 A | 4/1962 | Membrino |
| 3,031,121 A | 4/1962 | Chase |
| 3,065,514 A | 11/1962 | Henning et al. |
| 3,065,895 A | 11/1962 | Lipschutz |
| 3,096,879 A | 7/1963 | Schumacher |
| 3,097,782 A | 7/1963 | Koropatkin et al. |
| 3,182,913 A | 5/1965 | Brian |
| 3,193,176 A | 7/1965 | Gullickson et al. |
| 3,194,471 A | 7/1965 | Murphy |
| 3,206,103 A | 9/1965 | Bixler |
| 3,222,843 A | 12/1965 | Schneider |
| 3,236,206 A | 2/1966 | Willinger |
| 3,282,411 A | 11/1966 | Jardine |
| 3,286,825 A | 11/1966 | Laas |
| 3,335,941 A | 8/1967 | Gatward |
| 3,349,984 A | 10/1967 | Halko, Jr. |
| 3,371,462 A | 3/1968 | Nordkvist et al. |
| 3,375,934 A | 4/1968 | Bates |
| 3,399,818 A | 9/1968 | Stegner |
| 3,420,363 A | 1/1969 | Blickensderfer |
| 3,435,736 A | 4/1969 | Reiche |
| 3,465,948 A | 9/1969 | Boyer |
| 3,503,550 A | 3/1970 | Main et al. |
| 3,551,945 A | 1/1971 | Eyberg et al. |
| 3,670,948 A | 6/1972 | Berg |
| 3,703,383 A | 11/1972 | Kuchenbecker |
| 3,734,336 A | 5/1973 | Rankow et al. |
| 3,736,221 A | 5/1973 | Evers et al. |
| 3,747,743 A | 7/1973 | Hoffman, Jr. |
| 3,749,299 A | 7/1973 | Ingle |
| 3,836,044 A | 9/1974 | Tilp et al. |
| 3,843,038 A | 10/1974 | Sax |
| 3,850,362 A | 11/1974 | Stollberg et al. |
| 3,880,341 A | 4/1975 | Bamburg et al. |
| 3,883,065 A | 5/1975 | Presnick |
| 3,887,743 A | 6/1975 | Lane |
| 3,890,762 A | 6/1975 | Ernst et al. |
| 3,919,372 A | 11/1975 | Vogele |
| 3,945,561 A | 3/1976 | Strebelle |
| 3,976,605 A * | 8/1976 | Matsunaga ............ C08J 9/0061 521/88 |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,146,660 A | 3/1979 | Hall et al. |
| 4,169,540 A | 10/1979 | Larsson et al. |
| 4,170,304 A | 10/1979 | Huke |
| 4,211,267 A | 7/1980 | Skovgaard |
| 4,213,310 A | 7/1980 | Buss |
| 4,335,844 A | 6/1982 | Egli |
| 4,339,039 A | 7/1982 | Mykleby |
| 4,342,416 A | 8/1982 | Philips |
| 4,351,165 A | 9/1982 | Gottsegen et al. |
| 4,380,314 A | 4/1983 | Langston, Jr. et al. |
| D270,041 S | 8/1983 | Vestal |
| 4,396,144 A | 8/1983 | Gutierrez et al. |
| 4,411,373 A | 10/1983 | Kupersmit |
| 4,418,864 A | 12/1983 | Nielsen |
| 4,488,623 A | 12/1984 | Linnell, II et al. |
| 4,509,645 A | 4/1985 | Hotta |
| 4,536,145 A | 8/1985 | Sawyer et al. |
| 4,602,971 A | 7/1986 | Bergeron et al. |
| 4,679,242 A | 7/1987 | Brockhaus |
| 4,682,708 A | 7/1987 | Pool |
| 4,711,390 A | 12/1987 | Andrews et al. |
| 4,797,010 A | 1/1989 | Coelho |
| 4,805,776 A | 2/1989 | Namgyal et al. |
| 4,819,793 A | 4/1989 | Willard et al. |
| 4,828,133 A | 5/1989 | Hougendobler |
| 4,830,282 A | 5/1989 | Knight, Jr. |
| 4,889,252 A | 12/1989 | Rockom et al. |
| 4,930,903 A | 6/1990 | Mahoney |
| 4,953,705 A | 9/1990 | Evamy |
| 4,988,216 A | 1/1991 | Lyman |
| 4,989,780 A | 2/1991 | Foote et al. |
| 5,016,813 A | 5/1991 | Simons |
| 5,018,663 A | 5/1991 | Corso |
| 5,020,481 A | 6/1991 | Nelson |

(56) References Cited

U.S. PATENT DOCUMENTS

| | | |
|---|---|---|
| 5,062,527 A | 11/1991 | Westerman |
| 5,094,547 A | 3/1992 | Graham |
| 5,100,016 A | 3/1992 | Wischusen, III |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,185,904 A | 2/1993 | Rogers et al. |
| 5,201,868 A | 4/1993 | Johnson |
| 5,226,542 A | 7/1993 | Boecker et al. |
| 5,229,447 A | 7/1993 | Miyajima et al. |
| 5,230,450 A | 7/1993 | Mahvi et al. |
| 5,263,339 A | 11/1993 | Evans |
| 5,358,757 A | 10/1994 | Robinette et al. |
| 5,372,429 A | 12/1994 | Beaver, Jr. et al. |
| 5,417,342 A | 5/1995 | Hutchison |
| 5,418,031 A | 5/1995 | English |
| 5,441,170 A | 8/1995 | Bane, III |
| 5,454,471 A | 10/1995 | Norvell |
| 5,460,324 A | 10/1995 | Vinther |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,507,429 A | 4/1996 | Arlin |
| 5,511,667 A | 4/1996 | Carder |
| 5,512,345 A | 4/1996 | Tsutsumi et al. |
| 5,516,580 A | 5/1996 | Frenette et al. |
| 5,562,228 A | 10/1996 | Ericson |
| 5,562,980 A | 10/1996 | Koutitonsky |
| 5,573,119 A | 11/1996 | Luray |
| 5,596,880 A | 1/1997 | Welker et al. |
| 5,601,232 A | 2/1997 | Greenlee |
| 5,613,610 A | 3/1997 | Bradford |
| 5,615,795 A | 4/1997 | Tipps |
| 5,637,368 A | 6/1997 | Cadalbert et al. |
| 5,638,978 A | 6/1997 | Cadiente |
| 5,683,772 A | 11/1997 | Andersen et al. |
| 5,775,576 A | 7/1998 | Stone |
| 5,804,024 A | 9/1998 | Bloch et al. |
| 5,820,268 A | 10/1998 | Becker et al. |
| 5,842,571 A | 12/1998 | Rausch |
| 5,857,778 A | 1/1999 | Ells |
| 5,906,290 A | 5/1999 | Haberkorn |
| 5,922,379 A | 7/1999 | Wang |
| 5,989,371 A | 11/1999 | Nishimoto |
| 5,989,724 A | 11/1999 | Wittosch et al. |
| 5,993,953 A | 11/1999 | Takahashi et al. |
| 5,996,366 A | 12/1999 | Renard |
| 6,003,719 A | 12/1999 | Steward, III |
| 6,007,467 A | 12/1999 | Becker et al. |
| 6,022,615 A | 2/2000 | Rettenbacher |
| D421,457 S | 3/2000 | Crofton |
| 6,041,958 A | 3/2000 | Tremelo |
| 6,048,099 A | 4/2000 | Muffett et al. |
| 6,050,410 A | 4/2000 | Quirion |
| 6,050,412 A | 4/2000 | Clough et al. |
| 6,068,402 A | 5/2000 | Freese et al. |
| 6,080,096 A | 6/2000 | Becker et al. |
| 6,083,586 A | 7/2000 | Andersen et al. |
| 6,090,027 A | 7/2000 | Brinkman |
| 6,132,822 A | 10/2000 | Overcash et al. |
| 6,138,902 A | 10/2000 | Welch |
| 6,164,526 A | 12/2000 | Dalvey |
| 6,168,040 B1 | 1/2001 | Sautner et al. |
| 6,179,025 B1 | 1/2001 | Sutton |
| 6,200,404 B1 | 3/2001 | Andersen et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |
| 6,247,328 B1 | 6/2001 | Mogil |
| 6,253,993 B1 | 7/2001 | Lloyd et al. |
| 6,274,077 B1 | 8/2001 | Hur et al. |
| 6,295,830 B1 | 10/2001 | Newman |
| 6,295,860 B1 | 10/2001 | Sakairi et al. |
| 6,296,134 B1 | 10/2001 | Cardinale |
| 6,308,850 B1 | 10/2001 | Coom et al. |
| 6,325,281 B1 | 12/2001 | Grogan |
| 6,364,199 B1 | 4/2002 | Rose |
| 6,406,649 B1 | 6/2002 | Fisk |
| 6,416,620 B1 | 7/2002 | Narancic et al. |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,530,480 B1 | 3/2003 | Hardy |
| 6,582,124 B2 | 6/2003 | Mogil |
| 6,598,783 B2 | 7/2003 | Brinkman |
| 6,618,868 B2 | 9/2003 | Minnick |
| 6,641,758 B1 | 11/2003 | Arentsen et al. |
| 6,688,133 B1 | 2/2004 | Donefrio |
| 6,713,548 B1 | 3/2004 | Zhang et al. |
| 6,725,783 B2 | 4/2004 | Sekino |
| 6,726,017 B2 | 4/2004 | Maresh et al. |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,878,199 B2 | 4/2005 | Bowden et al. |
| 6,899,229 B2 | 5/2005 | Dennison et al. |
| 6,910,582 B2 | 6/2005 | Lantz |
| 6,913,389 B2 | 7/2005 | Kannankeril et al. |
| 6,971,539 B1 | 12/2005 | Abbe |
| 7,000,962 B2 | 2/2006 | Le |
| 7,019,271 B2 | 3/2006 | Wnek et al. |
| 7,041,369 B1 | 5/2006 | Mackey et al. |
| 7,070,841 B2 | 7/2006 | Benim et al. |
| 7,083,673 B2 | 8/2006 | Bowden et al. |
| 7,094,192 B2 | 8/2006 | Schoenberger et al. |
| 7,138,078 B2 | 11/2006 | Gotoh |
| 7,140,773 B2 | 11/2006 | Becker et al. |
| D534,797 S | 1/2007 | El-Afandi |
| 7,170,040 B1 | 1/2007 | Benim et al. |
| D545,189 S | 6/2007 | El-Afandi |
| 7,225,632 B2 | 6/2007 | Derifield |
| 7,225,970 B2 | 6/2007 | Philips |
| 7,229,677 B2 | 6/2007 | Miller |
| 7,235,308 B2 | 6/2007 | Druckrey et al. |
| D546,679 S | 7/2007 | El-Afandi |
| 7,255,261 B2 | 8/2007 | Mesly |
| 7,264,147 B1 | 9/2007 | Benson et al. |
| 7,270,358 B2 | 9/2007 | Hirsch |
| 7,392,931 B2 | 7/2008 | Issler |
| 7,452,316 B2 | 11/2008 | Cals et al. |
| D582,676 S | 12/2008 | Rothschild |
| 7,484,623 B2 | 2/2009 | Goodrich |
| 7,487,904 B2 | 2/2009 | McClure |
| 7,597,209 B2 | 10/2009 | Rothschild et al. |
| 7,607,563 B2 | 10/2009 | Hanna et al. |
| 7,659,316 B2 | 2/2010 | Kittle et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,832,558 B2 | 11/2010 | Cheng et al. |
| 7,841,512 B2 | 11/2010 | Westerman et al. |
| 7,845,508 B2 | 12/2010 | Rothschild et al. |
| 7,870,992 B2 | 1/2011 | Schille et al. |
| 7,908,870 B2 | 3/2011 | Williams |
| 7,909,806 B2 | 3/2011 | Goodman et al. |
| 7,943,765 B2 | 5/2011 | Muller et al. |
| 7,955,428 B2 | 6/2011 | Aoki et al. |
| 7,967,904 B2 | 6/2011 | Bowden et al. |
| 7,971,720 B2 | 7/2011 | Minkler |
| 8,003,032 B2 | 8/2011 | Al-Sabih et al. |
| 8,118,177 B2 | 2/2012 | Drapela et al. |
| 8,153,783 B2 | 4/2012 | Muller et al. |
| 8,209,995 B2 | 7/2012 | Kieling et al. |
| 8,210,353 B2 | 7/2012 | Epicureo |
| 8,277,718 B2 | 10/2012 | Aoki et al. |
| 8,343,024 B1 | 1/2013 | Contanzo, Jr. et al. |

(56) References Cited

U.S. PATENT DOCUMENTS

| | | |
|---|---|---|
| 8,365,943 B2 | 2/2013 | Bentley |
| 8,389,110 B2 | 3/2013 | Liu |
| 8,465,404 B2 | 6/2013 | Hadley |
| 8,567,662 B2 | 10/2013 | Costanzo, Jr. |
| 8,579,183 B2 | 11/2013 | Belfort et al. |
| 8,596,520 B2 | 12/2013 | Scott |
| 8,613,202 B2 | 12/2013 | Williams |
| 8,651,593 B2 | 2/2014 | Bezich et al. |
| 8,679,826 B2 | 3/2014 | Yamamoto et al. |
| 8,763,811 B2 | 7/2014 | Lantz |
| 8,763,886 B2 | 7/2014 | Hall |
| D710,692 S | 8/2014 | Genender |
| 8,795,470 B2 | 8/2014 | Henderson et al. |
| 8,875,885 B2 | 11/2014 | Padden et al. |
| 8,875,983 B2 | 11/2014 | Lenhard et al. |
| 8,919,082 B1 | 12/2014 | Cataldo |
| 8,960,528 B2 | 2/2015 | Sadlier |
| 9,139,319 B2 | 9/2015 | Crespo et al. |
| 9,199,782 B1 | 12/2015 | Cliatt |
| 9,217,253 B2 | 12/2015 | Collison |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,358,576 B2 | 6/2016 | Anderson et al. |
| 9,394,633 B2 | 7/2016 | Shimotsu et al. |
| D764,903 S | 8/2016 | Sanfilippo et al. |
| 9,408,445 B2 | 8/2016 | Mogil et al. |
| 9,410,032 B2 | 8/2016 | Kim et al. |
| 9,429,350 B2 | 8/2016 | Chapman, Jr. |
| 9,457,929 B2 | 10/2016 | Jenkins |
| 9,499,294 B1 | 11/2016 | Contanzo, Jr. |
| 9,550,618 B1 | 1/2017 | Jobe |
| 9,580,846 B2 | 2/2017 | Tseitlin et al. |
| 9,605,382 B2 | 3/2017 | Virtanen |
| 9,611,067 B2 | 4/2017 | Collison |
| 9,635,916 B2 | 5/2017 | Bezich et al. |
| 9,656,779 B2 | 5/2017 | Arki |
| 9,688,454 B2 | 6/2017 | Ranade |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,856,069 B1 | 1/2018 | Dong |
| 9,908,680 B2 | 3/2018 | Shi et al. |
| 9,908,684 B2 | 3/2018 | Collison |
| 9,920,517 B2 | 3/2018 | Sollie et al. |
| 9,950,830 B2 | 4/2018 | De Lesseux et al. |
| 9,957,098 B2 | 5/2018 | Jobe |
| 9,981,797 B2 | 5/2018 | Aksan et al. |
| 10,046,901 B1 | 8/2018 | Jobe |
| 10,065,786 B2 | 9/2018 | Kuhn |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,273,073 B2 | 4/2019 | Collison |
| 10,357,936 B1 | 7/2019 | Vincent et al. |
| 10,392,156 B2 | 8/2019 | McDonald et al. |
| 10,400,105 B2 | 9/2019 | Stevens |
| 10,435,194 B2 | 10/2019 | Sollie et al. |
| 10,442,600 B2 | 10/2019 | Waltermire et al. |
| 10,449,694 B2 | 10/2019 | Ojala et al. |
| 10,507,968 B2 | 12/2019 | Sollie et al. |
| 10,550,523 B2 | 2/2020 | Shih |
| 10,551,110 B2 | 2/2020 | Waltermire et al. |
| 10,583,977 B2 | 3/2020 | Collison et al. |
| 10,604,304 B2 | 3/2020 | Waltermire et al. |
| D881,690 S | 4/2020 | Smalley |
| 10,661,941 B2 | 5/2020 | Genender et al. |
| 10,662,301 B2 | 5/2020 | Krause et al. |
| 10,676,263 B2 | 6/2020 | Menzel, Jr. |
| 10,745,542 B2 | 8/2020 | Bastioli et al. |
| 10,787,303 B2 | 9/2020 | Chase et al. |
| 10,800,595 B2 | 10/2020 | Waltermire et al. |
| 10,843,840 B2 | 11/2020 | Sollie et al. |
| 10,858,141 B2 | 12/2020 | Sollie et al. |
| 10,875,979 B2 | 12/2020 | Ge et al. |
| 10,882,681 B2 | 1/2021 | Waltermire et al. |
| 10,882,682 B2 | 1/2021 | Collison et al. |
| 10,882,683 B2 | 1/2021 | Collison et al. |
| 10,882,684 B2 | 1/2021 | Sollie et al. |
| 10,926,939 B2 | 2/2021 | Collison et al. |
| 10,941,977 B2 | 3/2021 | Waltermire et al. |
| 10,947,025 B2 | 3/2021 | Sollie et al. |
| 10,954,057 B2 | 3/2021 | Waltermire et al. |
| 10,954,058 B2 | 3/2021 | Sollie et al. |
| 11,027,875 B2 | 6/2021 | Sollie et al. |
| 11,046,500 B2 | 6/2021 | Collison et al. |
| 11,059,652 B2 | 7/2021 | Sollie et al. |
| 11,066,228 B2 | 7/2021 | Sollie et al. |
| 11,117,731 B2 | 9/2021 | Waltermire et al. |
| 11,124,354 B2 | 9/2021 | Waltermire et al. |
| D934,064 S | 10/2021 | Satnick |
| 11,137,198 B2 | 10/2021 | Waltermire et al. |
| 11,148,870 B2 | 10/2021 | Collison et al. |
| 11,203,458 B2 | 12/2021 | Sollie et al. |
| 11,214,427 B2 | 1/2022 | Collison et al. |
| 11,215,393 B2 | 1/2022 | Waltermire et al. |
| 11,230,404 B2 | 1/2022 | Sollie et al. |
| 11,247,806 B2 | 2/2022 | Sollie et al. |
| 11,247,827 B2 | 2/2022 | Jobe |
| 11,255,596 B2 | 2/2022 | Waltermire et al. |
| 11,261,017 B2 | 3/2022 | Waltermire et al. |
| 11,267,641 B2 | 3/2022 | Collison et al. |
| 11,286,099 B2 | 3/2022 | Sollie et al. |
| 11,312,563 B2 | 4/2022 | Smith |
| 11,325,772 B2 | 5/2022 | Sollie et al. |
| D955,876 S | 6/2022 | Sill et al. |
| D957,246 S | 7/2022 | Culler et al. |
| D957,936 S | 7/2022 | Lincoln |
| D968,950 S | 11/2022 | Sollie et al. |
| 11,485,566 B2 | 11/2022 | Waltermire et al. |
| 11,524,832 B2 | 12/2022 | Sollie et al. |
| 11,542,092 B2 | 1/2023 | Sollie et al. |
| 11,565,871 B2 | 1/2023 | Waltermire et al. |
| 11,618,608 B2 | 4/2023 | Sollie et al. |
| 11,623,783 B2 | 4/2023 | Sollie et al. |
| 11,628,978 B2 | 4/2023 | Waltermire et al. |
| 11,634,265 B2 | 4/2023 | Collison et al. |
| 11,679,925 B2 | 6/2023 | Sollie et al. |
| 11,692,762 B2 | 7/2023 | Waltermire et al. |
| 11,697,542 B2 | 7/2023 | Sollie et al. |
| 11,713,180 B2 | 8/2023 | Sollie et al. |
| 11,718,464 B2 | 8/2023 | Sollie et al. |
| 11,724,851 B2 | 8/2023 | Sollie et al. |
| 11,780,635 B2 | 10/2023 | Sollie et al. |
| 11,780,636 B2 | 10/2023 | Sollie et al. |
| 11,780,666 B2 | 10/2023 | Collison et al. |
| 11,820,579 B1 | 11/2023 | Lantz |
| 11,858,717 B2 | 1/2024 | Waltermire et al. |
| 11,919,699 B2 | 3/2024 | Sollie et al. |
| 11,940,204 B2 | 3/2024 | Waltermire et al. |
| 11,975,910 B2 | 5/2024 | Sollie et al. |
| 11,999,553 B2 | 6/2024 | Sollie et al. |
| 12,038,227 B2 | 7/2024 | Waltermire et al. |
| 12,060,214 B2 | 8/2024 | Waltermire et al. |
| 12,179,990 B2 | 12/2024 | Sollie et al. |
| 12,195,266 B2 | 1/2025 | Sollie et al. |
| 2001/0010312 A1 | 8/2001 | Mogil |
| 2001/0024716 A1* | 9/2001 | Chen ............... D04H 1/66 428/317.9 |
| 2002/0020188 A1 | 2/2002 | Sharon et al. |
| 2002/0050324 A1 | 5/2002 | Middelstadt |
| 2002/0056500 A1 | 5/2002 | Collison et al. |
| 2002/0064318 A1 | 5/2002 | Malone et al. |
| 2002/0134698 A1 | 9/2002 | Rhodes et al. |
| 2002/0162767 A1 | 11/2002 | Ohtsubo |
| 2003/0099833 A1 | 5/2003 | Erb, Jr. et al. |
| 2003/0113563 A1 | 6/2003 | Buhring |
| 2003/0113565 A1 | 6/2003 | Silver et al. |
| 2003/0145561 A1 | 8/2003 | Cals et al. |
| 2003/0159777 A1 | 8/2003 | Tsujimoto et al. |
| 2004/0004111 A1 | 1/2004 | Cardinale |

(56) References Cited

U.S. PATENT DOCUMENTS

| | | |
|---|---|---|
| 2004/0031842 A1 | 2/2004 | Westerman et al. |
| 2004/0079794 A1 | 4/2004 | Mayer |
| 2004/0164132 A1 | 8/2004 | Kuester |
| 2004/0209058 A1 | 10/2004 | Chou et al. |
| 2005/0109655 A1 | 5/2005 | Vershum et al. |
| 2005/0117817 A1 | 6/2005 | Mogil et al. |
| 2005/0186417 A1 | 8/2005 | Rodriguez |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0062990 A1 | 3/2006 | Gotoh |
| 2006/0078720 A1 | 4/2006 | Toas et al. |
| 2006/0096978 A1 | 5/2006 | Lafferty et al. |
| 2006/0193541 A1 | 8/2006 | Norcom |
| 2006/0235099 A1 | 10/2006 | Kamite et al. |
| 2006/0243784 A1 | 11/2006 | Glaser et al. |
| 2006/0255507 A1 | 11/2006 | Bowden et al. |
| 2007/0000932 A1 | 1/2007 | Cron et al. |
| 2007/0000983 A1 | 1/2007 | Spurrell et al. |
| 2007/0012414 A1 * | 1/2007 | Kajander ............... D21F 11/04 162/156 |
| 2007/0051782 A1 | 3/2007 | Lantz |
| 2007/0071368 A1 | 3/2007 | Becker et al. |
| 2007/0122584 A1 | 5/2007 | Song et al. |
| 2007/0151685 A1 | 7/2007 | Horsfield et al. |
| 2007/0193298 A1 | 8/2007 | Derifield |
| 2007/0209307 A1 | 9/2007 | Andersen |
| 2007/0257040 A1 | 11/2007 | Price et al. |
| 2008/0095959 A1 | 4/2008 | Warner et al. |
| 2008/0095970 A1 | 4/2008 | Takashima et al. |
| 2008/0135564 A1 | 6/2008 | Romero |
| 2008/0173703 A1 | 7/2008 | Westerman et al. |
| 2008/0190940 A1 | 8/2008 | Scott |
| 2008/0203090 A1 | 8/2008 | Dickinson |
| 2008/0268220 A1 | 10/2008 | Olliges |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0078708 A1 | 3/2009 | Williams |
| 2009/0114311 A1 | 5/2009 | McDowell |
| 2009/0193765 A1 | 8/2009 | Lantz |
| 2009/0214142 A1 | 8/2009 | Bossel et al. |
| 2009/0275531 A1 | 11/2009 | Muller et al. |
| 2009/0283578 A1 | 11/2009 | Miller |
| 2009/0288791 A1 | 11/2009 | Hammer et al. |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0109196 A1 | 5/2010 | Al-Sabih et al. |
| 2010/0139878 A1 | 6/2010 | Clemente |
| 2010/0140124 A1 | 6/2010 | Hafner |
| 2010/0151164 A1 | 6/2010 | Grant et al. |
| 2010/0168260 A1 * | 7/2010 | Frenzel ............... C08J 9/36 521/55 |
| 2010/0219232 A1 | 9/2010 | Smith |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1 | 11/2010 | Hadley |
| 2010/0285294 A1 | 11/2010 | Crane et al. |
| 2010/0291822 A1 | 11/2010 | Netravali |
| 2010/0314397 A1 | 12/2010 | Williams et al. |
| 2010/0314437 A1 | 12/2010 | Dowd |
| 2011/0042388 A1 | 2/2011 | Tristancho Tello |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0240515 A1 | 10/2011 | Ridgeway |
| 2011/0244258 A1 | 10/2011 | Vonfelden |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0097067 A1 | 4/2012 | Fascio |
| 2012/0145568 A1 | 6/2012 | Collison et al. |
| 2012/0178856 A1 | 7/2012 | Gobl et al. |
| 2012/0193365 A1 | 8/2012 | Humphries et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0276619 A1 | 11/2012 | Yamamoto et al. |
| 2012/0279896 A1 | 11/2012 | Lantz |
| 2012/0292226 A1 | 11/2012 | Hilbish |
| 2012/0309246 A1 | 12/2012 | Tseitlin et al. |
| 2012/0328807 A1 | 12/2012 | Grimes |
| 2013/0017349 A1 | 1/2013 | Heiskanen et al. |
| 2013/0026215 A1 | 1/2013 | Lenhard et al. |
| 2013/0101855 A1 | 4/2013 | Cham et al. |
| 2013/0112694 A1 | 5/2013 | Bentley |
| 2013/0112695 A1 | 5/2013 | Hall |
| 2013/0140317 A1 | 6/2013 | Roskoss |
| 2013/0203879 A1 | 8/2013 | Rensen et al. |
| 2013/0256940 A1 | 10/2013 | Henderson et al. |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0144161 A1 | 5/2014 | Pointer et al. |
| 2014/0174682 A1 | 6/2014 | Brungardt |
| 2014/0248003 A1 | 9/2014 | Mogil et al. |
| 2014/0272163 A1 | 9/2014 | Tilton |
| 2014/0272352 A1 | 9/2014 | Tilton |
| 2014/0274633 A1 | 9/2014 | Tilton |
| 2014/0300026 A1 | 10/2014 | Taccolini |
| 2014/0312107 A1 | 10/2014 | Nash |
| 2014/0319018 A1 | 10/2014 | Collison |
| 2014/0367393 A1 | 12/2014 | Ranade |
| 2015/0068696 A1 | 3/2015 | Reed et al. |
| 2015/0110423 A1 | 4/2015 | Fox et al. |
| 2015/0111011 A1 | 4/2015 | Hoekstra et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0255009 A1 | 9/2015 | Akhter et al. |
| 2015/0259126 A1 | 9/2015 | McGoff et al. |
| 2015/0284131 A1 | 10/2015 | Genender et al. |
| 2015/0345853 A1 | 12/2015 | Deyen |
| 2015/0367981 A1 | 12/2015 | Moore |
| 2015/0377407 A1 | 12/2015 | Shinoki et al. |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0230343 A1 | 8/2016 | Pang et al. |
| 2016/0236498 A1 | 8/2016 | Anderson et al. |
| 2016/0264294 A1 | 9/2016 | Bacon |
| 2016/0304267 A1 | 10/2016 | Aksan |
| 2016/0312010 A1 | 10/2016 | Alavi |
| 2016/0312941 A1 | 10/2016 | Alavi et al. |
| 2016/0318648 A1 | 11/2016 | Kuninobu |
| 2016/0325915 A1 | 11/2016 | Aksan |
| 2016/0340064 A1 | 11/2016 | Loda |
| 2017/0015080 A1 | 1/2017 | Collison et al. |
| 2017/0021961 A1 | 1/2017 | Humphrey et al. |
| 2017/0043937 A1 | 2/2017 | Antz |
| 2017/0121052 A1 | 5/2017 | Morimoto |
| 2017/0144792 A1 | 5/2017 | Block |
| 2017/0198959 A1 | 7/2017 | Morris |
| 2017/0217654 A1 | 8/2017 | Harmon |
| 2017/0225870 A1 | 8/2017 | Collison |
| 2017/0233134 A9 | 8/2017 | Grajales et al. |
| 2017/0233165 A1 | 8/2017 | Kuhn |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0361973 A1 | 12/2017 | Padilla |

(56) References Cited

U.S. PATENT DOCUMENTS

| | | |
|---|---|---|
| 2017/0369226 A1 | 12/2017 | Chase et al. |
| 2017/0369667 A1 | 12/2017 | Ruckdaschel et al. |
| 2018/0002451 A1 | 1/2018 | Ge et al. |
| 2018/0050857 A1 | 2/2018 | Collison |
| 2018/0051460 A1 | 2/2018 | Sollie et al. |
| 2018/0086539 A1 | 3/2018 | Aksan et al. |
| 2018/0148245 A1 | 5/2018 | Aggarwal et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0319569 A1 | 11/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0009946 A1 | 1/2019 | Nixon et al. |
| 2019/0032991 A1 | 1/2019 | Waltermire et al. |
| 2019/0040221 A1 | 2/2019 | Hitzler et al. |
| 2019/0047775 A1 | 2/2019 | Waltermire et al. |
| 2019/0071550 A1 | 3/2019 | Ge et al. |
| 2019/0085155 A1 | 3/2019 | Niles |
| 2019/0144155 A1 | 5/2019 | Geng et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359411 A1 | 11/2019 | Fallgren |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367208 A1 | 12/2019 | Jobe |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0047976 A1 | 2/2020 | Collison et al. |
| 2020/0048422 A1 | 2/2020 | Doug et al. |
| 2020/0071056 A1 | 3/2020 | Henderson et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0129338 A1* | 4/2020 | Gardiner ............... A61L 15/425 |
| 2020/0140179 A1 | 5/2020 | Costanzo, Jr. |
| 2020/0148409 A1 | 5/2020 | Sollie et al. |
| 2020/0148410 A1 | 5/2020 | Sollie et al. |
| 2020/0148452 A1 | 5/2020 | Sollie et al. |
| 2020/0148453 A1 | 5/2020 | Sollie et al. |
| 2020/0214314 A1 | 7/2020 | Bakker et al. |
| 2020/0283188 A1 | 9/2020 | Sollie et al. |
| 2020/0308359 A1* | 10/2020 | Glenn .................... C08J 9/0085 |
| 2020/0318292 A1 | 10/2020 | Alden et al. |
| 2020/0346816 A1 | 11/2020 | Sollie et al. |
| 2020/0346841 A1 | 11/2020 | Sollie et al. |
| 2021/0039869 A1 | 2/2021 | Waltermire et al. |
| 2021/0039870 A1 | 2/2021 | Sollie et al. |
| 2021/0039871 A1 | 2/2021 | Sollie et al. |
| 2021/0070527 A1 | 3/2021 | Sollie et al. |
| 2021/0070529 A1 | 3/2021 | Sollie et al. |
| 2021/0070530 A1 | 3/2021 | Sollie et al. |
| 2021/0078755 A1 | 3/2021 | Sollie et al. |
| 2021/0101734 A1 | 4/2021 | Collison et al. |
| 2021/0101735 A1 | 4/2021 | Collison et al. |
| 2021/0101736 A1 | 4/2021 | Waltermire et al. |
| 2021/0101737 A1 | 4/2021 | Waltermire et al. |
| 2021/0102746 A1 | 4/2021 | Waltermire et al. |
| 2021/0155365 A1 | 5/2021 | Sollie et al. |
| 2021/0155367 A1 | 5/2021 | Sollie et al. |
| 2021/0163210 A1 | 6/2021 | Waltermire et al. |
| 2021/0179313 A1 | 6/2021 | Sollie et al. |
| 2021/0179337 A1 | 6/2021 | Sollie et al. |
| 2021/0347553 A1 | 11/2021 | Sollie et al. |
| 2022/0017260 A1 | 1/2022 | Sollie et al. |
| 2022/0024634 A1 | 1/2022 | Sollie et al. |
| 2022/0024635 A1 | 1/2022 | Sollie et al. |
| 2022/0026140 A1 | 1/2022 | Waltermire et al. |
| 2022/0026141 A1 | 1/2022 | Waltermire et al. |
| 2022/0033167 A1 | 2/2022 | Collison et al. |
| 2022/0081152 A1 | 3/2022 | Sollie et al. |
| 2022/0081186 A1 | 3/2022 | Waltermire et al. |
| 2022/0177216 A1 | 6/2022 | Sollie et al. |
| 2022/0185533 A1 | 6/2022 | Chen et al. |
| 2022/0242607 A1 | 8/2022 | Sollie et al. |
| 2022/0288870 A1 | 9/2022 | Collison et al. |
| 2022/0297918 A1 | 9/2022 | Collison et al. |
| 2022/0388755 A1 | 12/2022 | Waltermire et al. |
| 2022/0411167 A1 | 12/2022 | Sollie et al. |
| 2023/0125191 A1 | 4/2023 | Waltermire et al. |
| 2023/0159213 A1 | 5/2023 | Sollie et al. |
| 2023/0159214 A1 | 5/2023 | Sollie et al. |
| 2023/0182990 A1 | 6/2023 | Sollie et al. |
| 2023/0227210 A1 | 7/2023 | Waltermire et al. |
| 2023/0257157 A1 | 8/2023 | Sollie et al. |
| 2023/0280087 A1 | 9/2023 | Waltermire et al. |
| 2023/0322466 A1 | 10/2023 | Sollie et al. |
| 2023/0322467 A1 | 10/2023 | Sollie et al. |
| 2023/0322468 A1 | 10/2023 | Sollie et al. |
| 2023/0382627 A1 | 11/2023 | Collison et al. |
| 2024/0067438 A1 | 2/2024 | Waltermire et al. |
| 2024/0083659 A1 | 3/2024 | Sollie et al. |
| 2024/0159455 A1 | 5/2024 | Waltermire et al. |
| 2024/0159456 A1 | 5/2024 | Waltermire et al. |
| 2024/0262600 A1 | 8/2024 | Collison et al. |
| 2024/0318899 A1 | 9/2024 | Waltermire et al. |
| 2024/0336424 A1 | 10/2024 | Waltermire et al. |

FOREIGN PATENT DOCUMENTS

| | | | |
|---|---|---|---|
| AU | 2018260918 B2 | 5/2024 | |
| AU | 2018260919 B2 | 5/2024 | |
| AU | 2018264050 | 10/2024 | |
| AU | 2018260911 B2 | 11/2024 | |
| AU | 2018260914 B2 | 12/2024 | |
| AU | 2018260920 B2 | 12/2024 | |
| CA | 2019104 | 12/1991 | |
| CA | 2097735 | 12/1994 | |
| CA | 2145953 | 10/1996 | |
| CA | 2149939 | 11/1996 | |
| CN | 1073993 | 7/1993 | |
| CN | 1503962 | 6/2004 | |
| CN | 102206361 | 10/2011 | |
| CN | 102264961 | 11/2011 | |
| CN | 206494316 | 9/2017 | |
| CN | 108001787 | 5/2018 | |
| CN | 110204794 | 9/2019 | |
| CN | 117071332 A | 11/2023 | |
| DE | 1897846 | 7/1964 | |
| DE | 102011016500 | 10/2012 | |
| DE | 202017103230 | 7/2017 | |
| DE | 202017003908 | 10/2017 | |
| DE | 202018101998 | 7/2019 | |
| DE | 202019003407 | 11/2019 | |
| EP | 0133539 | 2/1985 | |
| EP | 0537058 | 4/1993 | |
| EP | 2990196 | 3/2016 | |
| EP | 3144248 | 3/2017 | |
| EP | 3348493 | 7/2018 | |
| EP | 2781652 B2 * | 9/2018 | ............ D04H 1/425 |
| EP | 3538708 | 1/2022 | |
| EP | 4071298 B1 | 1/2024 | |
| EP | 4043639 B1 | 1/2025 | |
| FR | 1241878 | 9/1960 | |

(56) References Cited

FOREIGN PATENT DOCUMENTS

| | | |
|---|---|---|
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2029461 | 3/1980 |
| GB | 2400096 | 5/2006 |
| GB | 2516490 | 1/2015 |
| GB | 2528289 | 1/2016 |
| GB | 2534912 | 8/2016 |
| JP | 01254557 | 10/1989 |
| JP | H0632386 | 2/1994 |
| JP | 106135487 | 5/1994 |
| JP | 2001009949 | 1/2001 |
| JP | 2005139582 | 6/2005 |
| JP | 2005247329 | 9/2005 |
| JP | 2006158584 | 6/2006 |
| JP | 4069255 | 4/2008 |
| JP | 2012126440 | 7/2012 |
| JP | 2017079632 | 5/2017 |
| KR | 101730461 | 4/2017 |
| WO | 8807476 | 10/1988 |
| WO | 9726192 | 7/1997 |
| WO | 9932374 | 7/1999 |
| WO | 2001070592 | 9/2001 |
| WO | 2009026256 | 2/2009 |
| WO | 2014147425 | 9/2014 |
| WO | 2016187435 A2 | 5/2016 |
| WO | 2016187435 A3 | 11/2016 |
| WO | 2017207974 | 12/2017 |
| WO | 2018089365 | 5/2018 |
| WO | 2018093586 | 5/2018 |
| WO | 2018227047 | 12/2018 |
| WO | 2019113453 | 6/2019 |
| WO | 2019125904 | 6/2019 |
| WO | 2019125906 | 6/2019 |
| WO | 2019226199 | 11/2019 |
| WO | WO-2020011587 A1 * 1/2020 ............ C08J 9/0061 | |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

US 10,899,530 B2, 01/2021, Sollie et al. (withdrawn)
US 10,899,531 B2, 01/2021, Sollie et al. (withdrawn)
US 11,027,908 B2, 06/2021, Sollie et al. (withdrawn)
US 11,040,817 B2, 06/2021, Sollie et al. (withdrawn)
US 11,072,486 B2, 07/2021, Waltermire et al. (withdrawn)
US 11,079,168 B2, 08/2021, Waltermire et al. (withdrawn)
US 11,084,644 B2, 08/2021, Waltermire et al. (withdrawn)
US 11,167,877 B2, 11/2021, Sollie et al. (withdrawn)
US 11,167,878 B2, 11/2021, Sollie et al. (withdrawn)
US 11,247,836 B2, 02/2022, Sollie et al. (withdrawn)
US 11,292,656 B2, 04/2022, Sollie et al. (withdrawn)
US D959,977 S, 08/2022, Sollie et al. (withdrawn)
US 11,479,403 B2, 10/2022, Sollie et al. (withdrawn)
US 11,498,745 B2, 11/2022, Sollie et al. (withdrawn)
US 11,591,131 B2, 02/2023, Sollie et al. (withdrawn)
US 11,591,132 B2, 02/2023, Sollie et al. (withdrawn)
US 11,603,253 B2, 03/2023, Collison et al. (withdrawn)
US 11,613,421 B2, 03/2023, Sollie et al. (withdrawn)
paperweb.com, 2006, downloaded online Sep. 26, 2023 from archive.org (Year: 2006).*
https://www.cnckitchen.com/blog/whats-stronger-3d-prints-or-wood (Year: 2022).*
https://www.paperonweb.com/A1030.htm#:~:text=Manila%20is%20considered%20the%20longest,3600mm)%20in%20the%20natural%20state. (Year: 2006).*
Sollie, Greg; Final Office Action for U.S. Appl. No. 17/100,819, filed Nov. 21, 2020, mailed Apr. 13, 2022, 39 ogs.
Sollie, Greg; Non-Final Office Action for U.S. Appl. No. 17/100,819, filed Nov. 21, 2020, mailed Sep. 29, 2021, 107 pgs.
"Green Cell Foam Shipping Coolers", located at <https://www.greencellfoam.com/shipping-coolers>, accessed on Oct. 18, 2019, 4 pgs.
Collison, Alan B.; Applicant Interview Summary for U.S. Appl. No. 15/677,738, filed Aug. 15, 2017, mailed Dec. 5, 2018, 4 pgs.
Collison, Alan B.; Applicant Interview Summary for U.S. Appl. No. 15/677,738, filed Aug. 15, 2017, mailed Jan. 22, 2019, 4 pgs.
Collison, Alan B.; Corrected Notice of Allowance for U.S. Appl. No. 15/677,738, filed Aug. 15, 2017, mailed Jul. 15, 2019, 7 pgs.
Collison, Alan B.; Final Office ACtion for U.S. Appl. No. 15/677,738, filed Aug. 15, 2017, mailed Feb. 28, 2019, 14 pgs.
Collison, Alan B.; Non-Final Office Action for U.S. Appl. No. 15/677,738, filed Aug. 15, 2017, mailed Oct. 23, 2018, 11 pgs.
Collison, Alan B.; Notice of Allowance for U.S. Appl. No. 15/677,738, filed Aug. 15, 2017, mailed Oct. 29, 2019, 14 pgs.
Collison, Alan B.; Notice of Allowance for U.S. Appl. No. 15/677,738, filed Aug. 15, 2017, mailed Jun. 19, 2019, 10 pgs.
Collison, Alan B.; Requirement for Restriction/Election for U.S. Appl. No. 15/677,738, filed Aug. 15, 2017, mailed Jul. 3, 2018, 8 pgs.
Collison, Alan B.; Requirement for Restriction/Election for U.S. Appl. No. 15/677,738, filed Aug. 15, 2017, mailed Jul. 31, 2018, 8 pgs.
Collison, Alan B.; Supplemental Notice of Allowance for U.S. Appl. No. 15/677,738, filed Aug. 15, 2017, mailed Dec. 10, 2019, 4 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf, 23 pgs.
Collison, Alan B.; Advisory Action for U.S. Appl. No. 16/658,756, filed Oct. 21, 2019, mailed Sep. 25, 2020, 4 pgs.
Collison, Alan B.; Applicant Interview Summary for U.S. Appl. No. 16/658,756, filed Oct. 21, 2019, mailed May 6, 2020, 3 pgs.
Collison, Alan B.; Applicant Interview Summary for U.S. Appl. No. 16/658,756, filed Oct. 21, 2019, mailed Jun. 29, 2020, 3 pgs.
Collison, Alan B.; Final Office Action for U.S. Appl. No. 16/658,756, filed Oct. 21, 2019, mailed Jun. 17, 2020, 10 pgs.
Collison, Alan B.; Non-Final Office Action for U.S. Appl. No. 16/658,756, filed Oct. 21, 2019, mailed Feb. 4, 2020, 14 pgs.
Collison, Alan B.; Notice of Allowance for U.S. Appl. No. 16/658,756, filed Oct. 21, 2019, mailed Oct. 23, 2020, 10 pgs.
MP Global Products LLC: European Search Report for application No. 17868605.1, mailed Mar. 16, 2020, 7 pgs.
MP Global Products LLC: Office Action for European application No. 17868605.1, mailed Dec. 3, 2020, 4 pgs.
MP Global Products, LLC; Office Action for Chinese patent application No. 201780081689.7, mailed Nov. 2, 2020, 17 pgs.
Collison, Alan B.; Non-Final Office Action for U.S. Appl. No. 17/181,377, filed Feb. 22, 2021, mailed Jul. 1, 2021, 22 pgs.
MP Global Products, LLC; Examination Report for Australian patent application No. 2017359035, mailed Nov. 27, 2020, 3 pgs.
Collison, Alan B.; Notice of Allowance for U.S. Appl. No. 17/181,377, filed Feb. 22, 2021, mailed Oct. 21, 2021, 6 pgs.
Collison, Alan B.; Restriction Requirement for U.S. Appl. No. 17/181,377, filed Feb. 22, 2021, mailed Jan. 22, 2021, 6 pgs.
MP Global Products LLC; Office Action for Chinese Patent Application No. 201780081689.7, mailed May 14, 2021, 17 pgs.
MP Global Products, LLC; Decision on Rejection for Chinese patent application No. 201780081689.7, mailed Sep. 23, 2021, 15 pgs.

(56) References Cited

OTHER PUBLICATIONS

Collison, Alan B.; Applicant-Initiated Interview Summary for U.S. Appl. No. 16/414,309, filed Jun. 16, 2019, mailed Aug. 21, 2020, 3 pgs.
Collison, Alan B.; Applicant-Initiated Interview Summary for U.S. Patent Application No. 16/414/309, filed May 16, 2019, mailed Oct. 15, 2020, 3 pgs.
Collison, Alan B.; Certificate of Correction for U.S. Appl. No. 16/414,309, filed May 16, 2019, mailed Mar. 9, 2021, 1 pg.
Collison, Alan B.; Final Office Action for U.S. Appl. No. 16/414,309, filed May 16, 2019, mailed Oct. 8, 2020, 15 pgs.
Collison, Alan B.; Non-Final Office Action for U.S. Appl. No. 16/414,309, filed May 16, 2019, mailed Jul. 17, 2020, 77 pgs.
Collison, Alan B.; Notice of Allowance for U.S. Patent Application No. 16/414/309, filed May 16, 2019, mailed Oct. 21, 2020, 6 pgs.
Collison, Alan B.; Requirement for Restriction/Election for U.S. Appl. No. 16/414,309, filed May 16, 2019, mailed Jun. 16, 2020, 5 pgs.
Collison, Alan B.; Applicant-Initiated Interview Summary for U.S. Appl. No. 17/123,673, filed Dec. 16, 2020, mailed Jun. 24, 2021, 2 pgs.
Collison, Alan B.; Certificate of Correction for U.S. Patent Application No. 11,214,427, filed Dec. 16, 2020, mailed Mar. 29, 2022, 1 pg.
Collison, Alan B.; Non-Final Office Action for U.S. Appl. No. 17/123,673, filed Dec. 16, 2020, mailed Mar. 23, 2021, 86 pgs.
Collison, Alan B.; Notice of Allowance for U.S. Patent Applicaiton No. U.S. Appl. No. 17/123,673, filed Dec. 16, 2020, mailed Jul. 1, 2021, 12 pgs.
Collison, Alan B.; Applicant-Initiated Interview Summary for U.S. Appl. No. 16/414,310, filed Jun. 16, 2019, mailed Jul. 30, 2020, 3 pgs.
Collison, Alan B.; Non-Final Office Action for U.S. Appl. No. 16/414,310, filed May 16, 2019, mailed Jul. 8, 2020, 84 pgs.
Collison, Alan B.; Notice of Allowance for U.S. Appl. No. 16/414,310, filed May 16, 2019, mailed Nov. 13, 2020, 15 pgs.
Collison, Alan; Final Office Action for U.S. Appl. No. 16/414,310, filed May 16, 2019, mailed Oct. 13, 2020, 30 pgs.
Collison, Alan B.; Applicant-Initiated Interview Summary for U.S. Appl. No. 17/123,676, filed Dec. 16, 2020, mailed May 4, 2021, 4 pgs.
Collison, Alan B.; Certificate of Correction for U.S. Appl. No. 17/123,676, filed Dec. 16, 2020, mailed Jan. 4, 2021, 1 pg.
Collison, Alan B.; Non-Final Office Action for U.S. Appl. No. 17/123,676, filed Dec. 16, 2020, mailed Feb. 3, 2021, 23 pgs.
Collison, Alan B.; Notice of Allowance for U.S. Appl. No. 17/123,676, filed Dec. 16, 2020, mailed May 13, 2021, 93 pgs.
Collison, Alan B.; Non-Final Office Action for U.S. Appl. No. 17/502,599, filed Oct. 15, 2021, mailed Nov. 30, 2021, 6 pgs.
Waltermire, Kamie; Non-Final Office Action for U.S. Appl. No. 17/127,102, filed Dec. 28, 2020, mailed Jan. 12, 2023, 19 pgs.
Collison, Alan B.; Notice of Allowance for U.S. Appl. No. 17/502,599, filed Oct. 15, 2021, mailed Jan. 23, 2023, 12 pgs.
Collison, Alan B.; Non-Final Office Action for U.S. Appl. No. 17/834,999, filed Jun. 8, 2022, mailed Jan. 27, 2023, 28 pgs.
MP Global Products, LLC; Office Action for Canadian patent application No. 3,043,192, filed Nov. 7, 2017, mailed Nov. 8, 2022, 3 pgs.
Waltermire, Jamie; Certificate of Correction for U.S. Appl. No. 15/482,186, filed Apr. 7, 2017, mailed Dec. 29, 2020, 1 pg.
Waltermire, Jamie; Non-Final Office Action for U.S. Appl. No. 15/482,186, filed Apr. 7, 2017, mailed Aug. 20, 2019, 81 pgs.
Waltermire, Jamie; Notice of Allowance for U.S. Appl. No. 15/482,186, filed Apr. 7, 2017, mailed Mar. 5, 2020, 29 pgs.
Waltermire, Jamie; Requirement for Restriction/Election for U.S. Appl. No. 15/482,186, filed Jan. 7, 2017, mailed Apr. 17, 2019, 7 pgs.
Waltermire, Jamie; Applicant-Initiated Interview Summary for U.S. Appl. No. 16/526,511, filed Jul. 30, 2019, mailed Jun. 12, 2020, 5 pgs.
Waltermire, Jamie; Final Office Action for U.S. Appl. No. 16/526,511, filed Jul. 30, 2019, mailed May 19, 2020, 39 pgs.
Waltermire, Jamie; Non-Final Office Action for U.S. Appl. No. 16/526,511, filed Jul. 30, 2019, mailed Dec. 9, 2019, 55 pgs.
Waltermire, Jamie; Non-Final Office Action for U.S. Appl. No. 16/526,511, filed Jul. 30, 2019, mailed Jul. 10, 2020, 23 pgs.
Waltermire, Jamie; Notice of Allowance for U.S. Appl. No. 16/526,511, filed Jul. 30, 2019, mailed Sep. 14, 2020, 18 pgs.
Carlson, Dave; Article entitled: "FBA Updates Voluntary Standard For Recyclable Wax Alternatives", dated Aug. 14, 2013, Fiber Box Association (Year: 2013), 2 pgs.
Waltermire, Jamie; Final Office Action for U.S. Appl. No. 17/079,437, filed Oct. 24, 2020, mailed Feb. 24, 2022, 24 pgs.
Waltermire, Jamie; Non-Final Office Action for U.S. Appl. No. 17/079,437, filed Oct. 24, 2020, mailed Sep. 20, 2021, 108 pgs.
Waltermire, Jamie; Final Office Action for U.S. Appl. No. 15/482,200, filed Apr. 7, 2017, mailed Jan. 2, 2019, 23 pgs.
Waltermire, Jamie; Non-Final Office Action for U.S. Appl. No. 15/482,200, filed Apr. 7, 2017, mailed Jun. 11, 2018, 36 pgs.
Waltermire, Jamie; Notice of Allowance for U.S. Appl. No. 15/482,200, filed Apr. 7, 2017, mailed May 14, 2019, 25 pgs.
Waltermire, Jamie; Applicant-Initiated Interview Summary for U.S. Appl. No. 16/530,045, filed Aug. 2, 2019, mailed Jun. 15, 2020, 3 pgs.
Waltermire, Jamie; Final Office Action for U.S. Appl. No. 16/530,045, filed Aug. 2, 2019, mailed Nov. 24, 2020, 40 pgs.
Waltermire, Jamie; Non-Final Office Action for U.S. Appl. No. 16/530,045, filed Aug. 2, 2019, mailed Dec. 20, 2019, 61 pgs.
Waltermire, Jamie; Non-Final Office Action for U.S. Appl. No. 16/530,045, filed Aug. 2, 2019, mailed Feb. 10, 2022, 82 pgs.
Waltermire, Jamie; Non-Final Office Action for U.S. Appl. No. 16/530,045, filed Aug. 2, 2019, mailed Jun. 27, 2020, 38 pgs.
Waltermire, Jamie; Non-Final Office Action for U.S. Appl. No. 16/164,933, filed Oct. 19, 2018, mailed Nov. 18, 2020, 104 pgs.
Waltermire, Jamie; Notice of Allowance for U.S. Appl. No. 16/164,933, filed Oct. 19, 2018, mailed May 14, 2021, 24 pgs.
Waltermire, Jamie; Notice of Allowance for U.S. Appl. No. 16/164,933, filed Oct. 19, 2018, mailed Aug. 9, 2021, 10 pgs.
Waltermire, Jamie; Corrected Notice of Allowance for U.S. Appl. No. 15/590,345, filed May 9, 2017, mailed Feb. 18, 2020, 9 pgs.
Waltermire, Jamie; Final Office Action for U.S. Appl. No. 15/590,345, filed May 9, 2017, mailed Mar. 19, 2019, 42 pgs.
Waltermire, Jamie; Non-Final Office Action for U.S. Appl. No. 15/590,345, filed May 9, 2017, mailed Aug. 24, 2018, 41 pgs.
Waltermire, Jamie; Notice of Allowance for U.S. Appl. No. 15/590,345, filed May 9, 2017, mailed Oct. 1, 2019, 28 pgs.
Waltermire, Jamie; Supplemental Notice of Allowance for U.S. Appl. No. 15/590,345, filed May 9, 2017, mailed Jan. 9, 2020, 8 pgs.
Waltermire, Jamie; Supplemental Notice of Allowance for U.S. Appl. No. 15/590,345, filed May 9, 2017, mailed Dec. 3, 2019, 14 pgs.
Waltermire, Jamie; Non-Final Office Action for U.S. Appl. No. 16/721,995, filed Dec. 20, 2019, mailed Dec. 27, 2021, 133 pgs.
Waltermire, Jamie; Requirement for Restriction/Election for U.S. Appl. No. 16/721,995, filed Dec. 20, 2019, mailed Aug. 13, 2021, 6 pgs.
Waltermire, Jamie; Applicant-Initiated Interview Summary for U.S. Appl. No. 15/590,349, filed Jun. 9, 2017, mailed Dec. 3, 2019, 3 pgs.
Waltermire, Jamie; Certificate of Correction for U.S. Appl. No. 15/590,349, filed May 9, 2017, mailed Jun. 1, 2021, 1 pg.
Waltermire, Jamie; Corrected Notice of Allowance for U.S. Appl. No. 15/590,349, filed May 9, 2017, mailed Nov. 2, 2020, 9 pgs.
Waltermire, Jamie; Corrected Notice of Allowance for U.S. Appl. No. 15/590,349, filed May 9, 2017, mailed Dec. 22, 2020, 9 pgs.
Waltermire, Jamie; Corrected Notice of Allowance for U.S. Appl. No. 15/590,349, filed May 9, 2017, mailed Feb. 5, 2021, 9 pgs.
Waltermire, Jamie; Final Office Action for U.S. Appl. No. 15/590,349, filed May 9, 2017, mailed Jan. 6, 2020, 26 pgs.
Waltermire, Jamie; Final Office Action for U.S. Appl. No. 15/590,349, filed May 9, 2017, mailed May 9, 2019, 31 pgs.
Waltermire, Jamie; Non-Final Office Action for U.S. Appl. No. 15/590,349, filed May 9, 2017, mailed Nov. 5, 2018, 41 pgs.

(56) References Cited

OTHER PUBLICATIONS

Waltermire, Jamie; Non-Final Office Action for U.S. Appl. No. 15/590,349, filed May 9, 2017, mailed Jun. 12, 2020, 30 pgs.
Waltermire, Jamie; Non-Final Office Action for U.S. Appl. No. 15/590,349, filed May 9, 2017, mailed Sep. 5, 2019, 25 pgs.
Waltermire, Jamie; Notice of Allowance for U.S. Appl. No. 15/590,349, filed May 9, 2017, mailed Oct. 20, 2020, 20 pgs.
Waltermire, Jamie; Requirement for Restriction/Election for U.S. Appl. No. 15/590,349, filed May 9, 2017, mailed Aug. 30, 2018, 10 pgs.
Waltermire, Jamie; Final Office Action for U.S. Appl. No. 16/293,716, filed Mar. 6, 2019, mailed Oct. 29, 2020, 19 pgs.
Waltermire, Jamie; Final Office Action for U.S. Appl. No. 16/293,716, filed Mar. 6, 2019, mailed Sep. 10, 2020, 24 pgs.
Waltermire, Jamie; Non-Final Office Action for U.S. Appl. No. 16/293,716, filed Mar. 6, 2019, mailed Feb. 5, 2021, 18 pgs.
Waltermire, Jamie; Non-Final Office Action for U.S. Appl. No. 16/293,716, filed Mar. 6, 2019, mailed May 5, 2020, 70 pgs.
Waltermire, Jamie; Non-Final Office Action for U.S. Appl. No. 16/293,716, filed Mar. 6, 2019, mailed Jul. 26, 2021, 26 pgs.
Waltermire, Jamie; Notice of Allowance for U.S. Appl. No. 16/293,716, filed Mar. 6, 2019, mailed Nov. 3, 2021, 20 pgs.
Waltermire, Jamie; Requirement for Restriction/Election for U.S. Appl. No. 16/293,716, filed Mar. 6, 2019, mailed Feb. 26, 2020, 6 pgs.
Sollie, Greg; Final Office Action for U.S. Appl. No. 16/382,710, filed Apr. 12, 2019, mailed Apr. 6, 2020, 33 pgs.
Sollie, Greg; Non-Final Office Action for U.S. Appl. No. 16/382,710, filed Apr. 12, 2019, mailed Oct. 10, 2019, 49 pgs.
Sollie, Greg; Notice of Allowance for U.S. Appl. No. 16/382,710, filed Apr. 12, 2019, mailed Oct. 21, 2020, 5 pgs.
Sollie, Greg; Notice of Allowance for U.S. Appl. No. 16/382,710, filed Apr. 12, 2019, mailed Jun. 3, 2020, 12 pgs.
Sollie, Greg; Requirement for Restriction/Election for U.S. Appl. No. 16/382,710, filed Apr. 12, 2019, mailed Jul. 15, 2019, 6 pgs.
Sollie, Greg; Certificate of Correction for U.S. Appl. No. 16/879,811, filed May 21, 2020, mailed Feb. 8, 2022, 1 pg.
Sollie, Greg; Non-Final Office Action for U.S. Appl. No. 16/879,811, filed May 21, 2020, mailed Jun. 22, 2021, 93 pgs.
Sollie, Greg; Notice of Allowance for U.S. Appl. No. 16/879,811, filed May 21, 2020, mailed Jul. 7, 2021, 5 ogs.
Sollie, Greg; Requirement for Restriction/Election for U.S. Appl. No. 16/879,811, filed May 21, 2020, mailed Apr. 15, 2021, 6 pgs.
Sollie, Greg; Certificate of Correction for U.S. Appl. No. 16/567,192, filed Sep. 11, 2019, mailed Feb. 16, 2021, 1 pg.
Sollie, Greg; Corrected Notice of Allowance for U.S. Appl. No. 16/567,192, filed Sep. 11, 2019, mailed Oct. 20, 2020, 8 pgs.
Sollie, Greg; Final Office Action for U.S. Appl. No. 16/567,192, filed Sep. 11, 2019, mailed Jun. 8, 2020, 20 pgs.
Sollie, Greg; Non-Final Office Action for U.S. Appl. No. 16/567,192, filed Sep. 11, 2019, mailed Dec. 10, 2019, 49 pgs.
Sollie, Greg; Notice of Allowance for U.S. Appl. No. 16/567,192, filed Sep. 11, 2019, mailed Aug. 7, 2020, 14 bgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Sollie, Greg; Final Office Action for U.S. Appl. No. 16/408,981, filed May 10, 2019, mailed Dec. 29, 2020, 22 pgs.
Sollie, Greg; Final Office Action for U.S. Appl. No. 16/408,981, filed May 10, 2019, mailed Feb. 24, 2020, 29 ogs.
Sollie, Greg; Non-Final Office Action for U.S. Appl. No. 16/408,981, filed May 10, 2019, mailed Aug. 20, 2019, 50 pgs.
Sollie, Greg; Non-Final Office Action for U.S. Appl. No. 16/408,981, filed May 10, 2019, mailed Sep. 16, 2020, 40 pgs.
Sollie, Greg; Notice of Allowance for U.S. Appl. No. 16/408,981, filed May 10, 2019, mailed Feb. 23, 2021, 6 pgs.
Sollie, Greg; Final Office Action for U.S. Appl. No. 17/185,616, filed Feb. 25, 2021, mailed Jan. 28, 2022, 37 pgs.
Sollie, Greg; Non-Final Office Action for U.S. Appl. No. 17/185,616, filed Feb. 25, 2021, mailed Sep. 15, 2021, 103 pgs.
Sollie, Greg; Non-Final Office Action for U.S. Appl. No. 16/886,040, filed May 28, 2020, mailed Mar. 30, 2021, 39 pgs.
Sollie, Greg; Notice of Allowance for U.S. Appl. No. 16/886,040, filed May 28, 2020, mailed Nov. 18, 2021, 10 ogs.
Sollie, Greg; Notice of Allowance for U.S. Appl. No. 16/886,040, filed May 28, 2020, mailed Jul. 7, 2021, 12 pgs.
Sollie, Greg; Requirement for Restriction/Election for U.S. Appl. No. 16/886,040, filed May 28, 2020, mailed Dec. 23, 2020, 6 pgs.
Avella, et al.; Article entitled: "Biodegradable PVOH-based foams for packaging applications", Journal of Cellular Plastics 2011, 47:271, 12 pgs.
Moo-Tun, et al.; Article entitled: "Assessing the effect of PLA, cellulose microfibers and CaCO3 on the properties of starch-based foams using a factorial design", Polymer Testing 86 (2020) 106482, available on Mar. 8, 2020, 10 pgs.
Salgado, et al.; Article entitled: "Biodegradable foams based on cassava starch, sunflower proteins and cellulose fibers obtained by a baking process", Journal of Food Engineering 85 (2008) 435-443, available online Aug. 15, 2007, 9 ogs.
Schmidt, et al.; Article entitled: "Characterization of Foams Obtained from Cassava Starch, Cellulose Fibres and Dolomitic Limestone by a Thermopressing Process", Brazilian Archives of Biology and Technology vol. 53, n. 1, pp. 88-192, Jan.-Feb. 2010, 8 pgs.
Waltermire, Jamie; International Preliminary Report on Patentability for PCT Application No. PCT/US18/65464, filed Dec. 13, 2018, mailed Jun. 24, 2021, 8 pgs.
Waltermire, Jamie; International Search Report and Written Opinion for PCT Application No. PCT/US18/65464, filed Dec. 13, 2018, mailed Mar. 11, 2019, 9 pgs.
Sollie, Greg; International Preliminary Report on Patentability for PCT Application No. PCT/US18/65459, filed Dec. 13, 2018, mailed Jul. 2, 2020, 11 pgs.
Sollie, Greg; International Search Report and Written Opinion for PCT Application No. PCT/US18/65459, filed Dec. 13, 2018, mailed May 1, 2019, 15 pgs.
Sollie, Greg; International Preliminary Report on Patentability for PCT Application No. PCT/US18/65461, filed Dec. 13, 2018, mailed Jul. 2, 2020, 12 pgs.
Sollie, Greg; International Search Report and Written Opinion for PCT Application No. PCT/US18/65461, filed Dec. 13, 2018, mailed Mar. 21, 2019, 13 pgs.
MP Global Products, LLC; First Examination Report for Australian patent application No. 2017359035, filed Nov. 7, 2017, mailed Nov. 27, 2020, 3 pgs.
MP Global Products, LLC; Office Action for Canadian patent application No. 3,043,192, filed Nov. 7, 2017, mailed Oct. 25, 2021, 11 pgs.
MP Global Products LLC: European Office Action for application No. 17868605.1, mailed Dec. 3, 2020, 4 pgs.
MP Global Products LLC: European Office Action Response for application No. 17868605.1, filed Jan. 19, 2021, 15 pgs.
MP Global Products LLC: European Office Action for application No. 17868605.1, mailed Apr. 13, 2021, 3 pgs.
MP Global Products, LLC; Office Action for Canadian patent application No. 3,043,192, filed Nov. 7, 2017, mailed Apr. 8, 2022, 9 pgs.
MP Global Products LLC: European Search Report Response for application No. 17868605.1, filed Oct. 2, 2020, 15 pgs.
Collison, Alan. B.; Extended European Search Report for application No. 21160713.0, filed Nov. 7, 2017, mailed May 10, 2021, 7 pgs.
Sollie, Greg; International Preliminary Report on Patentability for PCT/US18/65463, filed Dec. 13, 2018, mailed Dec. 3, 2020, 9 pgs.
Sollie, Greg; International Search Report and Written Opinion for PCT/US18/65463, filed Dec. 13, 2018, mailed Mar. 25, 2019, 11 pgs.
Sollie, Greg; International Preliminary Report on Patentability for PCT Application No. PCT/US20/24820, filed Mar. 26, 2020, mailed Nov. 11, 2021, 13 pgs.

(56) References Cited

OTHER PUBLICATIONS

Sollie, Greg; International Search Report and Written Opinion for PCT Application No. PCT/US20/24820, filed Mar. 26, 2020, mailed Jul. 2, 2020, 14 pgs.
Sollie, Greg; International Preliminary Report on Patentability for PCT Application No. PCT/US19/60486, filed Nov. 18, 2019, mailed May 27, 2021, 9 pgs.
Sollie, Greg; International Search Report and Written Opinion for PCT Application No. PCT/US19/60486, filed Nov. 18, 2019, mailed Jan. 13, 2020, 10 pgs.
Sollie, Greg; International Preliminary Report on Patentability for PCT Application No. PCT/US19/59764, filed Nov. 5, 2019, mailed May 27, 2021, 9 pgs.
Sollie, Greg; International Search Report and Written Opinion for PCT Application No. PCT/US19/59764, filed Nov. 5, 2019, mailed Jul. 1, 2020, 13 pgs.
Sollie, Greg; Invitation to Pay Additional Fees for PCT/US19/59764, filed Nov. 5, 2019, mailed Jan. 2, 2020, 2 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials- Fiber-Based Materials", Sustainable Packaging Solution, 2009, 19 pgs.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, mailed Feb. 19, 2018, 15 pgs.
MP Global Products; Article entitled: "Thermopod mailer envelopes and Thermokeeper insulated box liners", located at <http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Singh, et al; Article entitled: "Performance Comparison of Thermal Insulated Packaging Boxes, Bags and Refrigerants for Single-parcel Shipments", published Mar. 13, 2007, 19 pgs.
Tera-Pak; Article entitled: "Insulated Shipping Containers", located at <http://www.tera-pak.com/>, accessed on Mar. 20, 2017, 3 pgs.
Un Packaging; Article entitled: "CooLiner ® Insulated Shipping Bags", available at <http://www.chem-tran.com/packaging/supplies/cooliner-insulated-shipping-bags.php>, accessed on Aug. 30, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Benezet, et al.; Article entitled: "Mechanical and physical properties of expanded starch, reinforced by natural fibres", Industrial Corps and Products 37 (2012) 435-440, available online Oct. 4, 2011, 6 pgs.
Salazar Packaging; Article entitle: "Custom Packaging and Design", located at <https://salazarpackaging.com/custom-packaging-and-design/>, accessed on Sep. 28, 2017, 2 pgs.
Periwrap; Article entitled: "Insulated Solutions", located at <https://www.peri-wrap.com/insulation/>, accessed on Dec. 3, 2018, 9 pgs.
Waltermire, Jamie; Notice of Allowance for U.S. Appl. No. 16/530,045, filed Aug. 2, 2019, mailed Oct. 5, 2022, 14 pgs.
Waltermire, Jamie; Certificate of Correction for U.S. Appl. No. 16/293,716, filed Mar. 6, 2019, mailed Aug. 30, 2022, 1 pg.
Waltermire, Jamie; Applicant-Initiated Interview Summary for U.S. Appl. No. 17/127,102, filed Dec. 18, 2020, mailed Oct. 31, 2022, 2 pgs.
Waltermire, Jamie; Final Office Action for U.S. Appl. No. 17/127,102, filed Dec. 18, 2020, mailed Oct. 5, 2022, 31 pgs.
Waltermire, Jamie; Requirement for Restriction/Election for U.S. Appl. No. 17/497,054, filed Oct. 8, 2021, mailed Oct. 6, 2022, 8 pgs.
Waltermire, Jamie; Non-Final Office Action for U.S. Appl. No. 17/497,057, filed Oct. 8, 2021, mailed Oct. 19, 2022, 115 pgs.
Waltermire, Jamie; Requirement for Restriction/Election for U.S. Appl. No. 17/497,057, filed Oct. 8, 2021, mailed Sep. 15, 2022, 8 pgs.
Sollie, Greg; Applicant-Initiated Interview Summary for U.S. Appl. No. 16/951,465, filed Nov. 18, 2020, mailed Oct. 5, 2022, 2 pgs.
Sollie, Greg; Notice of Allowance for U.S. Appl. No. 17/100,819, filed Nov. 21, 2020, mailed Sep. 7, 2022, 15 pgs.
Collison, Alan B.; Applicant-Initiated Interview Summary for U.S. Appl. No. 17/502,599, filed Oct. 15, 2021, mailed Oct. 27, 2022, 2 pgs.
Collison, Alan B.; Non-Final Office Action for U.S. Appl. No. 17/502,599, filed Oct. 15, 2021, mailed Sep. 12, 2022, 12 pgs.
Collison, Alan B.; Applicant-Initiated Interview Summary for U.S. Appl. No. 17/834,999, filed Jun. 8, 2022, mailed Oct. 27, 2022, 2 pgs.
Collison, Alan B.; Non-Final Office Action for U.S. Appl. No. 17/834,999, filed Jun. 8, 2022, mailed Sep. 12, 2022, 104 pgs.
Collison, Alan B.; Restriction Requirement for U.S. Appl. No. 17/688,356, filed Mar. 7, 2022, mailed Jun. 20, 2022, 9 pgs.
Sollie, Greg; Non-Final Office Action for U.S. Appl. No. 16/280,595, filed 2/20/20219, mailed Sep. 16, 2022, 14 pgs.
Sollie, Greg; Non-Final Office Action for U.S. Appl. No. 17/679,772, filed Feb. 24, 2022, mailed Oct. 17, 2022, 108 pgs.
Sollie, Greg; Notice of Allowance for U.S. Appl. No. 17/493,449, filed Oct. 4, 2021, mailed Oct. 13, 2022, 10 pgs.
Sollie, Greg; Notice of Allowance for U.S. Appl. No. 17/493,474, filed Oct. 4, 2021, mailed Oct. 13, 2022, 15 pgs.
Sollie, Greg; Requirement for Restriction/Election for U.S. Appl. No. 17/307,650, filed May 4, 2021, mailed Oct. 28, 2022, 6 pgs.
Collison, Alan B.; Examination Report for Australian patent application No. 2021204424, filed Nov. 7, 2017, mailed Aug. 25, 2022, 8 pgs.
MP Global Products, LLC; Extended European Search Report for application No. 22152100.8, mailed Jun. 2, 2022, 7 pgs.
Collison, Alan B.; Extended European Search Report for application No. 22173063.3, filed Nov. 7, 2017, mailed Sep. 9, 2022, 7 pgs.
Amazon. ECOOPTS Cling Wrap Plastic Food Wrap with Slide Cutter. First available Dec. 21, 2020. Visited Sep. 2, 2022. https://www.amazon.com/ECOOPTS-Cling-Plastic-Cutter-121 N %C3%971 000FT/dp/B08R3L7K4W/ (Year: 2020), 7 pgs.
Sollie, Greg; Notice of Allowance for U.S. Appl. No. 29/745,881, filed Aug. 10, 2020, mailed Sep. 13, 2022, 12 pgs.
Waltermire, Jamie; Notice of Allowance for U.S. Appl. No. 17/079,437, filed Oct. 24, 2020, mailed Jun. 2, 2022, 21 pgs.
Sollie, Greg; Non-Final Office Action for U.S. Appl. No. 16/951,465, filed Nov. 18, 2020, mailed May 13, 2022, 123 pgs.
Sollie, Greg; Final Office Action for U.S. Appl. No. 16/280,595, filed Feb. 20, 2019, mailed May 31, 2022, 27 ogs.
Any Custom Box. Perforated Dispenser Boxes. Publication date unavailable. Visited May 2, 2022. https://anycustombox.com/folding-cartons/perforated-dispenser-boxes/, 9 pgs.
Massage Warehouse. Cando® Low Powder 100 Yard Perforated Dispenser. Publication date unavailable. Visited May 2, 2022. https://www.massagewarehouse.com/products/cando-perf-low-powder-1 DO-yd-dispenser/, 2 pgs.
Premier Storage. Oil & Fuel Absorbent Pads. Publication date unavailable. Visited May 2, 2022. https://www.premier-storage.co.uk/oil-and-fuel-absorbent-pads-bonded-and-perforated-double-weight.html, 1 pg.
Sollie, Greg; Notice of Allowance for U.S. Appl. No. 29/745,881, filed Aug. 10, 2020, mailed May 9, 2022, 139 pgs.
Collison, Alan B.; Office Action for Chinese patent application No. 2021107289972, filed Nov. 7, 2017, mailed May 7, 2022, 20 pgs.

(56) References Cited

OTHER PUBLICATIONS

Waltermire, Jamie; Certificate of Correction for U.S. Appl. No. 16/526,555, filed Jul. 30, 2019, mailed Nov. 16, 2021, 1 pg.
Waltermire, Jamie; Final Office Action for U.S. Appl. No. 16/526,555, filed Jul. 30, 2019, mailed Mar. 8, 2021, 25 pgs.
Waltermire, Jamie; Non-Final Office Action for U.S. Appl. No. 16/526,555, filed Jul. 30, 2019, mailed Oct. 27, 2020, 39 pgs.
Waltermire, Jamie; Non-Final Office Action for U.S. Appl. No. 16/526,555, filed Jul. 30, 2019, mailed Apr. 2, 2020, 63 pgs.
Waltermire, Jamie; Notice of Allowance for U.S. Appl. No. 16/526,555, filed Jul. 30, 2019, mailed May 21, 2021, 32 pgs.
Waltermire, Jamie; Requirement for Restriction/Election for U.S. Appl. No. 16/526,555, filed Jul. 30, 2019, mailed Jan. 17, 2020, 7 pgs.
Waltermire, Jamie; Supplemental Notice of Allowance for U.S. Appl. No. 16/526,555, filed Jul. 30, 2019, mailed Jun. 8, 2021, 13 pgs.
Waltermire, Jamie; Supplemental Notice of Allowance for U.S. Appl. No. 16/526,555, filed Jul. 30, 2019, mailed Aug. 11, 2021, 8 pgs.
Waltermire, Jamie; Requirement for Restriction/Election for U.S. Appl. No. 17/127,050, filed Dec. 18, 2020, mailed Apr. 14, 2022, 5 pgs.
Waltermire, Jamie; Final Office Action for U.S. Appl. No. 15/663,905, filed Jul. 31, 2017, mailed Aug. 22, 2019, 23 pgs.
Waltermire, Jamie; Non-Final Office Action for U.S. Appl. No. 15/663,905, filed Jul. 31, 2017, mailed Jun. 25, 2019, 66 pgs.
Waltermire, Jamie; Notice of Allowance for U.S. Appl. No. 15/663,905, filed Jul. 31, 2017, mailed Nov. 4, 2019, 18 pgs.
Waltermire, Jamie; Requirement for Restriction/Election for U.S. Appl. No. 15/663,905, filed Jul. 31, 2017, mailed Mar. 21, 2019, 8 pgs.
Waltermire, Jamie; Advisory Action for U.S. Appl. No. 16/381,678, filed Apr. 11, 2019, mailed Feb. 26, 2020, 3 pgs.
Waltermire, Jamie; Corrected Notice of Allowance for U.S. Appl. No. 16/381,678, filed Apr. 11, 2019, mailed Aug. 9, 2021, 8 pgs.
Waltermire, Jamie; Examiner-Initiated Interview Summary for U.S. Appl. No. 16/381,678, filed Apr. 11, 2019, mailed Aug. 30, 2021, 2 pgs.
Waltermire, Jamie; Final Office Action for U.S. Appl. No. 16/381,678, filed Apr. 11, 2019, mailed Oct. 19, 2020, 24 pgs.
Waltermire, Jamie; Final Office Action for U.S. Appl. No. 16/381,678, filed Apr. 11, 2019, mailed Dec. 30, 2019, 17 pgs.
Waltermire, Jamie; Final Office Action for U.S. Appl. No. 16/381,678, filed Apr. 11, 2019, mailed Jun. 16, 2020, 8 pgs.
Waltermire, Jamie; Final Office Action for U.S. Appl. No. 16/381,678, filed Apr. 11, 2019, mailed Aug. 20, 2020, 21 pgs.
Waltermire, Jamie; Non-Final Office Action for U.S. Appl. No. 16/381,678, filed Apr. 11, 2019, mailed Mar. 5, 2021, 36 pgs.
Waltermire, Jamie; Non-Final Office Action for U.S. Appl. No. 16/381,678, filed Apr. 11, 2019, mailed Apr. 17, 2020, 30 pgs.
Waltermire, Jamie; Non-Final Office Action for U.S. Appl. No. 16/381,678, filed Apr. 11, 2019, mailed Sep. 9, 2019, 50 pgs.
Waltermire, Jamie; Notice of Allowance for U.S. Appl. No. 16/381,678, filed Apr. 11, 2019, mailed Jun. 3, 2021, 14 pgs.
Waltermire, Jamie; Notice of Allowance for U.S. Appl. No. 16/381,678, filed Apr. 11, 2019, mailed Jul. 30, 2020, 15 pgs.
Waltermire, Jamie; Final Office Action for U.S. Appl. No. 16/561,203, filed Sep. 5, 2019, mailed Sep. 10, 2020, 25 pgs.
Waltermire, Jamie; Non-Final Office Action for U.S. Appl. No. 16/561,203, filed Sep. 5, 2019, mailed May 6, 2020, 59 pgs.
Waltermire, Jamie; Notice of Allowance for U.S. Appl. No. 16/561,203, filed Sep. 5, 2019, mailed Nov. 3, 2020, 14 pgs.
Waltermire, Jamie; Requirement for Restriction/Election for U.S. Appl. No. 16/561,203, filed Sep. 5, 2019, mailed Feb. 26, 2020, 5 pgs.
Waltermire, Jamie; Final Office Action for U.S. Appl. No. 16/689,407, filed Nov. 20, 2019, mailed Jan. 23, 2021, 18 pgs.
Waltermire, Jamie; Non-Final Office Action for U.S. Appl. No. 16/689,407, filed Nov. 20, 2019, mailed Jan. 8, 2021, 92 pgs.
Waltermire, Jamie; Notice of Allowance for U.S. Appl. No. 16/689,407, filed Nov. 20, 2019, mailed Jul. 19, 2021, 12 pgs.
Waltermire, Jamie; Requirement for Restriction/Election for U.S. Appl. No. 16/689,407, filed Nov. 20, 2019, mailed Oct. 29, 2020, 6 pgs.
Waltermire, Jamie; Requirement for Restriction/Election for U.S. Appl. No. 17/127,102, filed Dec. 18, 2020, mailed Apr. 14, 2022, 6 pgs.
Waltermire, Jamie; Final Office Action for U.S. Appl. No. 16/689,433, filed Nov. 20, 2019, mailed Aug. 5, 2021, 23 pgs.
Waltermire, Jamie; Non-Final Office Action for U.S. Appl. No. 16/689,433, filed Nov. 20, 2019, mailed Feb. 23, 2021, 88 pgs.
Waltermire, Jamie; Notice of Allowance for U.S. Appl. No. 16/689,433, filed Nov. 20, 2019, mailed Oct. 15, 2021, 14 pgs.
Waltermire, Jamie; Requirement for Restriction/Election for U.S. Appl. No. 16/689,433, filed Nov. 20, 2019, mailed Oct. 16, 2020, 6 pgs.
Sollie, Greg; Non-Final Office Action for U.S. Appl. No. 15/845,545, filed Dec. 18, 2017, mailed Mar. 5, 2019, 41 pgs.
Sollie, Greg; Notice of Allowance for U.S. Appl. No. 15/845,545, filed Dec. 18, 2017, mailed Jun. 19, 2019, 20 pgs.
Sollie, Greg; Final Office Action for U.S. Appl. No. 16/552,277, filed Aug. 27, 2019, mailed Aug. 7, 2020, 19 pgs.
Sollie, Greg; Non-Final Office Action for U.S. Appl. No. 16/552,277, filed Aug. 27, 2019, mailed Jun. 3, 2020, 68 pgs.
Sollie, Greg; Notice of Allowance for U.S. Appl. No. 16/552,277, filed Aug. 27, 2019, mailed Aug. 31, 2020, 6 pgs.
Sollie, Greg; Restriction Requirement for U.S. Appl. No. 16/552,277, filed Aug. 27, 2019, mailed Apr. 20, 2020, 7 pgs.
Sollie, Greg; Certificate of Correction for U.S. Appl. No. 15/845,540, filed Dec. 18, 2017, mailed Jun. 1, 2021, 1 pg.
Sollie, Greg; Final Office Action for U.S. Appl. No. 15/845,540, filed Dec. 18, 2017, mailed Oct. 30, 2019, 56 pgs.
Sollie, Greg; Final Office Action for U.S. Appl. No. 15/845,540, filed Dec. 18, 2017, mailed Sep. 2, 2020, 28 ogs.
Sollie, Greg; Non-Final Office Action for U.S. Appl. No. 15/845,540, filed Dec. 18, 2017, mailed Feb. 19, 2020, 32 pgs.
Sollie, Greg; Non-Final Office Action for U.S. Appl. No. 15/845,540, filed Dec. 18, 2017, mailed Apr. 2, 2019, 50 pgs.
Sollie, Greg; Notice of Allowance for U.S. Appl. No. 15/845,540, filed Dec. 18, 2017, mailed Sep. 17, 2020, 5 pgs.
Waltermire, Jamie; Final Office Action for U.S. Appl. No. 16/530,045, filed Aug. 2, 2019, mailed Jun. 9, 2022, 20 pgs.
Waltermire, Jamie; Non-Final Office Action for U.S. Appl. No. 16/721,995, filed Dec. 20, 2019, mailed Jul. 5, 2022, 28 pgs.
Waltermire, Jamie; Certificate of Correction for U.S. Appl. No. 16/293,716, filed Mar. 6, 2019, mailed Aug. 12, 2022, 3 pgs.
Waltermire, Jamie; Non-Final Office Action for U.S. Appl. No. 17/127,050, filed Dec. 18, 2020, mailed Jun. 17, 2022, 147 pgs.
Waltermire, Jamie; Non-Final Office Action for U.S. Appl. No. 17/127,102, filed Dec. 18, 2020, mailed Jun. 27, 2022, 128 pgs.
Sollie, Greg; Non-Final Office Action for U.S. Appl. No. 16/951,454, filed Nov. 18, 2020, mailed Aug. 4, 2022, 165 pgs.
Sollie, Greg; Restriction Requirement for U.S. Appl. No. 16/951,454, filed Nov. 18, 2020, mailed Jun. 14, 2022, 6 pgs.
Solie, Greg; Final Office Action for U.S. Appl. No. 16/951,465, filed Nov. 18, 2020, mailed Aug. 18, 2022, 20 pgs.
Sollie, Greg; Non-Final Office Action for U.S. Appl. No. 17/492,285, filed Oct. 1, 2021, mailed Jul. 11, 2022, 109 pgs.
Sollie, Greg; Notice of Allowance for U.S. Appl. No. 17/185,616, filed Feb. 25, 2021, mailed Jun. 17, 2022, 18 pgs.
Sollie, Greg; Non-Final Office Action for U.S. Appl. No. 17/493, filed Oct. 4, 2021, mailed Jul. 14, 2022, 110 pgs.
Sollie, Greg; Non-Final Office Action for U.S. Appl. No. 17/493,474, filed Oct. 4, 2021, mailed Jul. 11, 2022, 112 pgs.
Waltermire, Jamie; Notice of Allowance for U.S. Appl. No. 16/721,995, filed Dec. 20, 2019, mailed Dec. 5, 2022, 22 pgs.
Waltermire, Jamie; Non-Final Office Action for U.S. Appl. No. 17/127,050, filed Dec. 18, 2020, mailed Dec. 2, 2022, 22 pgs.
Waltermire, Jamie; Advisory Action for U.S. Appl. No. 17/127,102, filed Dec. 18, 2020, mailed Dec. 7, 2022, 4 pgs.
Waltermire, Jamie; Non-Final Office Action for U.S. Appl. No. 17/497,054, filed Oct. 8, 2021, mailed Nov. 15, 2022, 131 pgs.

(56) References Cited

OTHER PUBLICATIONS

Sollie, Greg; Notice of Allowance for U.S. Appl. No. 16/951,454, filed Nov. 18, 2020, mailed Nov. 15, 2022, 13 pgs.
Sollie, Greg; Non-Final Office Action for U.S. Appl. No. 16/951,465, filed Nov. 18, 2020, mailed Dec. 13, 2022, 17 pgs.
Collison, Alan B .; Applicant-Initiated Interview Summary for U.S. Appl. No. 17/688,356, filed Mar. 7, 2022, mailed Dec. 28, 2022, 3 pgs.
Collison, Alan B .; Non-Final Office Action for U.S. Appl. No. 17/688,356, filed Mar. 7, 2022, mailed Oct. 24, 2022, 41 pgs.
Sollie, Greg; Non-Final Office Action for U.S. Appl. No. 17/307,650, filed May 4, 2021, mailed Nov. 30, 2022, 139 pgs.
Collison, Alan B .; Examination Report for Australian patent application No. 2021204424, filed Nov. 7, 2017, mailed Dec. 6, 2022, 2 pgs.
Collison, Alan B .; Office Action for Chinese patent application No. 2021107289972, filed Nov. 7, 2017, mailed Nov. 23, 2022, 7 pgs.
Collison, Alan B.; Notice of Allowance for U.S. Appl. No. 17/502,599, filed Oct. 15, 2021, mailed Mar. 9, 2022, 94 pgs.
Sollie, Greg; Applicant Initiated Interview Summary for U.S. Appl. No. 15/988,550, filed May 24, 2018, mailed Dec. 27, 2019, 3 pgs.
Sollie, Greg; Applicant-Initiated Interview Summary for U.S. Appl. No. 15/988,550, filed May 24, 2018, mailed Dec. 24, 2020, 2 pgs.
Sollie, Greg; Final Office Action for U.S. Appl. No. 15/988,550, filed May 24, 2018, mailed Aug. 14, 2019, 19 ogs.
Sollie, Greg; Final Office Action for U.S. Appl. No. 15/988,550, filed May 24, 2018, mailed Aug. 27, 2020, 27 pgs.
Sollie, Greg; Non-Final Office Action for U.S. Appl. No. 15/988,550, filed May 24, 2018, mailed Oct. 9, 2019, 17 pgs.
Sollie, Greg; Non-Final Office Action for U.S. Appl. No. 15/988,550, filed May 24, 2018, mailed Mar. 11, 2020, 35 pgs.
Sollie, Greg; Non-Final Office Action for U.S. Appl. No. 15/988,550, filed May 24, 2018, mailed May 29, 2019, 47 pgs.
Sollie, Greg; Notice of Allowance for U.S. Appl. No. 15/988,550, filed May 24, 2018, mailed Apr. 13, 2021, 21 ogs.
Sollie, Greg; Advisory Action for U.S. Appl. No. 16/280,595, filed Feb. 20, 2019, mailed Jul. 6, 2020, 3 pgs.
Sollie, Greg; Applicant-Initiated Interview Summary for U.S. Appl. No. 16/280,595, filed Feb. 20, 2019 mailed May 6, 2020, 3 pgs.
Sollie, Greg; Final Office Action for U.S. Appl. No. 16/280,595, filed Feb. 20, 2019, mailed Oct. 3, 2019, 19 pgs.
Sollie, Greg; Final Office Action for U.S. Appl. No. 16/280,595, filed Feb. 20, 2019, mailed Dec. 30, 2020, 25 pgs.
Sollie, Greg; Final Office Action for U.S. Appl. No. 16/280,595, filed Feb. 20, 2019, mailed Mar. 24, 2020, 20 pgs.
Sollie, Greg; Final Office Action for U.S. Appl. No. 16/280,595, filed Feb. 20, 2019, mailed Aug. 16, 2021, 21 pgs.
Sollie, Greg; Non-Final Office Action for U.S. Appl. No. 16/280,595, filed Feb. 20, 2019, mailed Dec. 19, 2019, 23 pgs.
Sollie, Greg; Non-Final Office Action for U.S. Appl. No. 16/280,595, filed Feb. 20, 2019, mailed Dec. 8, 2021, 17 pgs.
Sollie, Greg; Non-Final Office Action for U.S. Appl. No. 16/280,595, filed Feb. 20, 2019, mailed Apr. 9, 2021, 20 pgs.
Sollie, Greg; Non-Final Office Action for U.S. Appl. No. 16/280,595, filed Feb. 20, 2019, mailed May 29, 2019, 60 pgs.
Sollie, Greg; Non-Final Office Action for U.S. Appl. No. 16/280,595, filed Feb. 20, 2019, mailed Aug. 28, 2020, 26 pgs.
Sollie, Greg; Advisory Action for U.S. Appl. No. 16/530,052, filed Aug. 2, 2019, mailed Mar. 9, 2022, 4 pgs.
Sollie, Greg; Advisory Action for U.S. Appl. No. 16/530,052, filed Aug. 2, 2019, mailed Jun. 29, 2021, 15 pgs.
Sollie, Greg; Applicant-Initiated Interview Summary for U.S. Appl. No. 16/530,052, filed Aug. 2, 2019, mailed Feb. 5, 2020, 2 pgs.
Sollie, Greg; Final Office Action for U.S. Appl. No. 16/530,052, filed Aug. 2, 2019, mailed Dec. 27, 2019, 49 bgs.
Sollie, Greg; Final Office Action for U.S. Appl. No. 16/530,052, filed Aug. 2, 2019, mailed Dec. 8, 2021, 17 pgs.
Sollie, Greg; Final Office Action for U.S. Appl. No. 16/530,052, filed Aug. 2, 2019, mailed Apr. 20, 2021, 27 pgs.
Sollie, Greg; Final Office Action for U.S. Appl. No. 16/530,052, filed Aug. 2, 2019, mailed Aug. 28, 2020, 29 ogs.
Sollie, Greg; Non-Final Office Action for U.S. Appl. No. 16/530,052, filed Aug. 2, 2019, mailed Oct. 2, 2019, 12 pgs.
Sollie, Greg; Non-Final Office Action for U.S. Appl. No. 16/530,052, filed Aug. 2, 2019, mailed Dec. 18, 2020, 17 pgs.
Sollie, Greg; Non-Final Office Action for U.S. Appl. No. 16/530,052, filed Aug. 2, 2019, mailed Mar. 3, 2020, 24 pgs.
Sollie, Greg; Non-Final Office Action for U.S. Appl. No. 16/530,052, filed Aug. 2, 2019, mailed Aug. 13, 2021, 22 pgs.
Cellulose Material Solutions, LLC; Brochure for Infinity Care Thermal Liner, accessed on Oct. 22, 2018, 2 ogs.
Sollie, Greg; Applicant-Initiated Interview Summary for U.S. Appl. No. 16/401,603, filed May 2, 2019, mailed May 15, 2020, 3 pgs.
Sollie, Greg; Final Office Action for U.S. Appl. No. 16/401,603, filed May 2, 2019, mailed Jun. 30, 2020, 13 ogs.
Sollie, Greg; Non-Final Office Action for U.S. Appl. No. 16/401,603, filed May 2, 2019, mailed Mar. 10, 2020, 67 pgs.
Sollie, Greg; Notice of Allowance for U.S. Appl. No. 16/401,603, filed May 2, 2019, mailed Aug. 31, 2020, 14 pgs.
Sollie, Greg; Requirement for Restriction/Election for U.S. Appl. No. 16/401,603, filed May 2, 2019, mailed Feb. 18, 2020, 6 pgs.
Sollie, Greg; Non-Final Office Action for U.S. Appl. No. 17/078,884, filed Oct. 23, 2020, mailed Aug. 12, 2021, 105 pgs.
Sollie, Greg; Notice of Allowance for U.S. Appl. No. 17/078,884, filed Oct. 23, 2020, mailed Nov. 22, 2021, 12 pgs.
Sollie, Greg; Applicant-Initiated Interview Summary for U.S. Appl. No. 17/078,891, filed Oct. 23, 2020, mailed Oct. 25, 2021, 2 pgs.
Sollie, Greg; Non-Final Office Action for U.S. Appl. No. 17/078,891, filed Oct. 23, 2020, mailed Aug. 23, 2021, 104 pgs.
Sollie, Greg; Notice of Allowance for U.S. Appl. No. 17/078,891, filed Oct. 23, 2020, mailed Dec. 1, 2021, 12 ogs.
Sollie, Greg; Non-Final Office Action for U.S. Appl. No. 16/401,607, filed May 2, 2019, mailed Aug. 19, 2020, 38 pgs.
Sollie, Greg; Notice of Allowance for U.S. Appl. No. 16/401,607, filed May 2, 2019, mailed Dec. 4, 2020, 12 ogs.
ULINE; Article entitled: Corrugated Corner Protectors—4 × 4, accessed on Oct. 25, 2018, 1 pg.
Sollie, Greg; Certificate of Correction for U.S. Appl. No. 17/187,239, filed Feb. 26, 2021, mailed Apr. 26, 2022, 1 pg.
Sollie, Greg; Non-Final Office Action for U.S. Appl. No. 17/187,239, filed Feb. 26, 2021, mailed Sep. 21, 2021, 99 pgs.
Sollie, Greg; Notice of Allowance for U.S. Appl. No. 17/187,239, filed Feb. 26, 2021, mailed Oct. 13, 2021, 5 pgs.
DHL Express; Brochure for Dry Ice Shipping Guidelines, accessed on Oct. 26, 2018, 12 pgs.
Sollie, Greg; Corrected Notice of Allowance for U.S. Appl. No. 16/382,710, filed Apr. 12, 2019, mailed Sep. 24, 2020, 9 pgs.
Waltermire, Jamie; Notice of Allowance for U.S. Appl. No. 17/127,050, filed Dec. 18, 2020, mailed Aug. 7, 2023, 14 pgs.
Waltermire, Jamie; Non-Final Office Action for U.S. Appl. No. 17/127,060, filed Dec. 18, 2020, mailed Jun. 21, 2023, 159 pgs.
Waltermire, Jamie; Final Office Action for U.S. Appl. No. 17/127,102, filed Dec. 18, 2020, mailed Jul. 6, 2023, 35 pgs.
Waltermire, Jamie; Non-Final Office Action for U.S. Appl. No. 17/497,054, filed Oct. 8, 2021, mailed Aug. 3, 2023, 24 pgs.
Sollie, Greg; Certificate of Correction for U.S. Appl. No. 16/951,465, filed Nov. 18, 2020, mailed Aug. 1, 2023, 1 pg.
Collison, Alan B.; Advisory Action for U.S. Appl. No. 17/688,356, filed Mar. 7, 2022, mailed Jul. 25, 2023, 6 ogs.
Collison, Alan B.; Non-Final Office Action for U.S. Appl. No. 17/688,356, filed Mar. 7, 2022, mailed Jul. 31, 2023, 18 pgs.
Sollie, Greg; Final Office Action for U.S. Appl. No. 17/901,558, filed Sep. 1, 2022, mailed Aug. 21, 2023, 25 bgs.
Sollie, Greg; Certificate of Correction for U.S. Appl. No. 17/493,449, filed Oct. 4, 2021, mailed Aug. 15, 2023, 1 pg.
Sollie, Greg; Notice of Allowance for U.S. Appl. No. 18/094,806, filed Jan. 9, 2023, mailed Jul. 21, 2023, 12 pgs.
Sollie, Greg; Certificate of Correction for U.S. Appl. No. 17/493,474, filed Oct. 4, 2021, mailed Aug. 1, 2023, 3 pgs.
Sollie, Greg; Notice of Allowance for U.S. Appl. No. 18/095,310, filed Jan. 10, 2023, mailed Jul. 28, 2023, 19 pgs.

(56) References Cited

OTHER PUBLICATIONS

Waltermire, Jamie; Certificate of Correction for U.S. Appl. No. 16/530,045, filed Aug. 2, 2019, mailed Mar. 28, 2023, 1 pg.
Waltermire, Jamie; Notice of Allowance for U.S. Appl. No. 17/497,057, filed Oct. 8, 2021, mailed Feb. 16, 2023, 25 pgs.
Sollie, Greg; Notice of Allowance for U.S. Appl. No. 16/951,465, filed Nov. 18, 2020, mailed Feb. 28, 2023, 12 ogs.
Sollie, Greg; Certificate of Correction for U.S. Appl. No. 17/100,819, filed Nov. 21, 2020, mailed Feb. 28, 2023, 2 pgs.
Collison, Alan B.; Applicant-Initiated Interview Summary for U.S. Appl. No. 17/688,356, filed Mar. 7, 2022, mailed Apr. 6, 2023, 3 pgs.
Collison, Alan B.; Final Office Action for U.S. Appl. No. 17/688,356, filed Mar. 7, 2022, mailed Feb. 1, 2023, 21 pgs.
Sollie, Greg; Notice of Allowance for U.S. Appl. No. 16/280,595, filed Feb. 20, 2019, mailed Mar. 31, 2023, 27 bgs.
Sollie, Greg; Notice of Allowance for U.S. Appl. No. 17/492,285, filed Oct. 1, 2021, mailed Feb. 8, 2023, 25 pgs.
Sollie, Greg; Certificate of Correction for U.S. Appl. No. 17/185,616, filed Feb. 25, 2021, mailed Feb. 28, 2023, 11 pg.
Sollie, Greg; Non-Final Office Action for U.S. Appl. No. 17/901,558, filed Sep. 1, 2022, mailed Feb. 15, 2023, 128 pgs.
Sollie, Greg; Notice of Allowance for U.S. Appl. No. 17/307,650, filed May 4, 2021, mailed Mar. 9, 2023, 15 pgs.
MP Global Products, L.L.C.; Examination Report for Australian patent application No. 2021245201, filed Nov. 7, 2017, mailed Feb. 21, 2023, 3 pgs.
Waltermire, Jamie; Final Office Action for U.S. Appl. No. 17/127,050, filed Dec. 18, 2020, mailed Jan. 26, 2023, 32 pgs.
Waltermire, Jamie; Final Office Action for U.S. Appl. No. 17/497,054, filed Oct. 8, 2021, mailed Apr. 24, 2023, 33 pgs.
Sollie, Greg; Notice of Allowance for U.S. Appl. No. 16/951,454, filed Nov. 18, 2020, mailed May 2, 2023, 6 ogs.
Collison, Alan B.; Certificate of Correction for U.S. Appl. No. 17/502,599, filed Oct. 15, 2021, mailed Jun. 6, 2023, 1 pg.
Collison, Alan B.; Notice of Allowance for U.S. Appl. No. 17/834,999, filed Jun. 8, 2022, mailed May 18, 2023, 14 pgs.
Collison, Alan B.; Advisory Action for U.S. Appl. No. 17/688,356, filed Mar. 7, 2022, mailed Apr. 26, 2023, 7 ogs.
Sollie, Greg; Non-Final Office Action for U.S. Appl. No. 17/679,772, filed Feb. 24, 2022, mailed May 2, 2023, 29 pgs.
Sollie, Greg; Non-Final Office Action for U.S. Appl. No. 17/536,878, filed Nov. 29, 2021, mailed Apr. 12, 2023, 140 pgs.
Sollie, Greg; Non-Final Office Action for U.S. Appl. No. 18/094,806, filed Jan. 9, 2023, mailed Apr. 21, 2023, 118 pgs.
Sollie, Greg; Non-Final Office Action for U.S. Appl. No. 18/095,310, filed Jan. 10, 2023, mailed Apr. 24, 2023, 118 pgs.
Collison, Alan B.; Office Action for Chinese patent application No. 2021107289972, filed Nov. 7, 2017, mailed Apr. 15, 2023, 7 pgs.
Waltermire, Jamie; Non-Final Office Action for U.S. Appl. No. 17/891,565, filed Aug. 19, 2022, mailed Sep. 6, 2023, 115 pgs.
Waltermire, Jamie; Requirement for Restriction/Election for U.S. Appl. No. 17/173,293, filed Feb. 11, 2021, mailed Aug. 30, 2023, 6 pgs.
Waltermire, Jamie; Final Office Action for U.S. Appl. No. 17/127,060, filed Dec. 18, 2020, mailed Oct. 19, 2023, 44 pgs.
Waltermire, Jamie; Notice of Allowance for U.S. Appl. No. 17/127,102, filed Dec. 18, 2020, mailed Oct. 20, 2023, 10 pgs.
Waltermire, Jamie; Certificate of Correction for U.S. Appl. No. 17/497,057, filed Oct. 8, 2021, mailed Sep. 5, 2023, 1 pg.
Solie, Greg; Certificate of Correction for U.S. Appl. No. 16/280,595, filed Feb. 20, 2019, mailed Sep. 12, 2023, 2 pgs.
Sollie, Greg; Notice of Allowance for U.S. Appl. No. 17/679,772, filed Feb. 24, 2022, mailed Aug. 30, 2023, 12 pgs.
Sollie, Greg; Final Office Action for U.S. Appl. No. 17/536,878, filed Nov. 29, 2021, mailed Oct. 20, 2023, 29 pgs.
Sollie, Greg; Requirement for Restriction/Election for U.S. Appl. No. 18/140,641, filed Apr. 28, 2023, mailed Nov. 8, 2023, 5 pgs.
Sollie, Greg; Examination Report for Australian application No. 2018260918, filed Nov. 8, 2018, mailed Oct. 13, 2023, 5 pgs.
Sollie, Greg; Examination Report for Australian patent application No. 2018260919, filed Nov. 8, 2018, mailed Oct. 16, 2023, 4 pgs.
Waltermire, Jamie; Certificate of Correction for U.S. Appl. No. 17/127,050, filed Dec. 18, 2020, mailed Feb. 13, 2024, 1 pg.
Waltermire, Jamie; Non-Final Office Action for U.S. Appl. No. 17/127,060, filed Dec. 18, 2020, mailed Mar. 13, 2024, 18 pgs.
Waltermire, Jamie; Advisory Action for U.S. Appl. No. 17/497,054, filed Oct. 8, 2021, mailed Jan. 30, 2024, 11 pgs.
Waltermire, Jamie; Notice of Allowance for U.S. Appl. No. 17/497,054, filed Oct. 8, 2021, mailed Mar. 6, 2024, 11 pgs.
Sollie, Greg; Non-Final Office Action for U.S. Appl. No. 18/106,169, filed Feb. 6, 2023, mailed Feb. 12, 2024, 148 pgs.
Sollie, Greg; Non-Final Office Action for U.S. Appl. No. 17/901,558, filed Sep. 1, 2022, mailed Mar. 11, 2024, 30 pgs.
Sollie, Greg; Non-Final Office Action for U.S. Appl. No. 18/208,704, filed Jun. 12, 2023, mailed Feb. 13, 2024, 148 pgs.
Collison, Alan B.; Office Action for Canadian patent application No. 3,176,052, filed Nov. 7, 2027, mailed Feb. 27, 2024, 10 pgs.
Collison, Alan B.; Extended European Search Report for application No. 23211653.3, filed Nov. 7, 2017, mailed Mar. 14, 2024, 7 pgs.
Sollie, Greg; Examination Report for Australian Patent Application No. 2018264050, filed Nov. 14, 2018, mailed Mar. 7, 2024, 5 pgs.
Solli, Greg; Non-Final Office Action for U.S. Appl. No. 17/536,878, filed Nov. 29, 2011, mailed Mar. 21, 2024, 25 pgs.
Collison, Alan B.; Non-Final Office Action for U.S. Appl. No. 18/234,425, filed Aug. 16, 2023, mailed Apr. 11, 2024, 143 pgs.
Waltermire, Jamie; Certificate of Correction for U.S. Appl. No. 15/482,186, filed Apr. 7, 2017, mailed Apr. 23, 2024, 1 pg.
Waltermire, Jamie; Non-Final Office Action for U.S. Appl. No. 17/891,565, filed Aug. 19, 2022, mailed Mar. 29, 2024, 24 pgs.
Waltermire, Jamie; Notice of Allowance for U.S. Appl. No. 18/146,232, filed Dec. 23, 2022, mailed Mar. 25, 2024, 149 pgs.
Waltermire, Jamie; Requirement for Restriction/Election for U.S. Appl. No. 18/385,726, filed Oct. 31, 2023, mailed May 10, 2024, 5 pgs.
Waltermire, Jamie; Non-Final Office Action for U.S. Appl. No. 17/538,795, filed Nov. 30, 2021, mailed May 13, 2024, 157 pgs.
Waltermire, Jamie; Certificate of Correction for U.S. Appl. No. 17/497,057, filed Oct. 8, 2021, mailed Apr. 23, 2024, 1 pg.
Sollie, Greg; Certificate of Correction for U.S. Appl. No. 18/095,310, filed Jan. 10, 2023, mailed Apr. 16, 2024, 1 pg.
Sollie, Greg; Non-Final Office Action for U.S. Appl. No. 18/208,704, filed Jun. 12, 2023, mailed May 22, 2024, 18 pgs.
Sollie, Greg; Notice of Allowance for U.S. Appl. No. 18/208,709, filed Jun. 12, 2023, mailed Apr. 9, 2024, 9 pgs.
Waltermire, Jamie; Examination Report for Australian patent application No. 2018260901, filed Nov. 8, 2018, mailed Apr. 30, 2024, 4 pgs.
Waltermire, Jamie; Examination Report for Australian patent application No. 2018260911, filed Nov. 8, 2018, mailed Apr. 30, 2024, 4 pgs.
Waltermire, Jamie; Examination Report for Australian patent application No. 2018260914, filed Nov. 8, 2018, mailed Apr. 30, 2024, 4 pgs.
Waltermire, Jamie; Examination Report for Australian patent application No. 2018260915, filed Nov. 8, 2018, mailed May 30, 2024, 4 pgs.
Waltermire, Jamie; Examination Report for Australian patent application No. 2018260920, filed Nov. 8, 2018, mailed May 18, 2024, 4 pgs.
MP Global Products, LLC; Office Action for European patent application No. 22152100.8, mailed Mar. 19, 2024, 4 pgs.
Collison, Alan B.; Non-Final Office Action for U.S. Appl. No. 18/612,835, filed Mar. 21, 2024, mailed Sep. 11, 2024, 65 pgs.
Waltermire, Jamie; Advisory Action for U.S. Appl. No. 17/891,565, filed Aug. 19, 2022, mailed Oct. 31, 2024, 14 pgs.
Waltermire, Jamie; Non-Final Office Action for U.S. Appl. No. 17/127,060, filed Dec. 18, 2020, mailed Oct. 9, 2024, 24 pgs.
Waltermire, Jamie; Final Office Action for U.S. Appl. No. 18/385,726, filed Oct. 31, 2023, mailed Oct. 22, 2024, 31 pgs.
Sollie, Greg; Notice of Allowance for U.S. Appl. No. 18/140,641, filed Apr. 28, 2023, mailed Oct. 31, 2024, 22 pgs.

(56) References Cited

OTHER PUBLICATIONS

Waltermire, Jamie; Examination Report for Australian Patent Application No. 2018260901, filed Nov. 8, 2018, mailed Oct. 24, 2024, 4 pgs.
Waltermire, Jamie; Examination Report for Australian Patent Application No. 2018260915, filed Nov. 8, 2018, mailed Oct. 2, 2024, 4 pgs.
Waltermire, Jamie; Examination Report for Australian Patent Application No. 2024216411, filed Nov. 8, 2018, mailed Oct. 8, 2024, 5 pgs.
Waltermire, Jamie; Final Office Action for U.S. Appl. No. 17/891,565, filed Aug. 19, 2022, mailed Jan. 17, 2024, 77 pgs.
Waltermire, Jamie; Non-Final Office Action for U.S. Appl. No. 17/173,293, filed Feb. 11, 2021, mailed Dec. 22, 2023, 168 pgs.
Waltermire, Jamie; Advisory Action for U.S. Appl. No. 17/127,060, filed Dec. 18, 2020, mailed Dec. 21, 2023, 8 pgs.
Waltermire, Jamie; Final Office Action for U.S. Appl. No. 17/497,054, filed Oct. 8, 2021, mailed Nov. 28, 2023, 26 pgs.
Collison, Alan B.; Final Office Action for U.S. Appl. No. 17/688,356, filed Mar. 7, 2022, mailed Nov. 21, 2023, 29 pgs.
Sollie, Greg; Advisory Action for U.S. Appl. No. 17/536,878, filed Nov. 29, 2021, mailed Jan. 12, 2024, 8 pgs.
Sollie, Greg; Non-Final Office Action for U.S. Appl. No. 18/140,641, filed Apr. 28, 2023, mailed Dec. 27, 2023, 147 pgs.
Sollie, Greg; Advisory Action for U.S. Appl. No. 17/901,558, filed Sep. 1, 2022, mailed Dec. 12, 2023, 3 pgs.
Sollie, Greg; Requirement for Restriction/Election for U.S. Appl. No. 18/208,704, filed Jun. 12, 2023, mailed Jan. 9, 2024, 6 pgs.
Sollie, Greg; Notice of Allowance for U.S. Appl. No. 18/208,708, filed Jun. 12, 2023, mailed Jan. 17, 2024, 142 pgs.
Sollie, Greg; Notice of Allowance for U.S. Appl. No. 18/208,709, filed Jun. 12, 2023, mailed Jan. 17, 2024, 76 pgs.
Sollie, Greg; Examination Report for Australian application No. 2018260918, filed Nov. 8, 2018, mailed Dec. 2, 2023, 5 pgs.
Sollie, Greg; Examination Report for Australian patent application No. 2018260919, filed Nov. 8, 2018, mailed Dec. 5, 2023, 4 pgs.
Waltermire, Jamie; Non-Final Office Action for U.S. Appl. No. 18/416,948, filed Jan. 19, 2024, mailed Sep. 23, 2024, 155 pgs.
Waltermire, Jamie; Requirement for Restriction/Election for U.S. Appl. No. 18/416,948, filed Jan. 19, 2024, mailed Aug. 5, 2024, 6 pgs.
Waltermire, Jamie; Requirement for Restriction/Election for U.S. Appl. No. 18/734,865, filed Jun. 5, 2024, mailed Sep. 28, 2024, 6 pgs.
Collison, Alan B.; Final Office Action for U.S. Appl. No. 18/234,425, filed Aug. 16, 2023, mailed Jul. 23, 2024, 12 pgs.
Collison, Alan B.; Restriction Requirement for U.S. Appl. No. 18/612,835, filed Mar. 21, 2024, mailed May 22, 2024, 12 pgs.
MP Global Products LLC; Notice of Decision to Grant for European Patent Application No. 17868605.1, mailed Dec. 23, 2021, 2 pgs.
MP Global Products, L.L.C.; Notice of Acceptance of Patent Application for Australian Patent Application No. 2017359035, mailed Jun. 25, 2021, 3 pgs.
Waltermire, Jamie; Final Office Action for U.S. Appl. No. 17/891,565, filed Aug. 19, 2022, mailed Aug. 21, 2024, 33 pgs.
Fibre Box Association (FBA); "Voluntary Standard for Repulping and Recycling Corrugated Fiberboard Treated to Improve Its Performance in the Presence of Water and Water Vapor", 2013, 23 pgs.
NC State University Bio Resources; "Repulping High Wet-Strength Waste Banknote Paper by a Dual-pH Pretreatment Process", 2012, 7 pgs.
Waltermire, Jamie; Non-Final Office Action for U.S. Appl. No. 18/115,791, filed Mar. 1, 2023, mailed Aug. 28, 2024, 167 pgs.
Waltermire, Jamie; Final Office Action for U.S. Appl. No. 17/173,293, filed Feb. 11, 2021, mailed Jun. 6, 2024, 27 pgs.
Waltermire, Jamie; Non-Final Office Action for U.S. Appl. No. 17/173,293, filed Feb. 11, 2021, mailed Sep. 10, 2024, 32 pgs.
Waltermire, Jamie; Advisory Action for U.S. Appl. No. 17/127,060, filed Dec. 18, 2020, mailed Aug. 30, 2024, 8 pgs.
Waltermire, Jamie; Final Office Action for U.S. Appl. No. 17/127,060, filed Dec. 18, 2020, mailed Jun. 24, 2024, 25 pgs.
Waltermire, Jamie; Non-Final Office Action for U.S. Appl. No. 18/385,726, filed Oct. 31, 2023, mailed Jul. 9, 2024, 148 pgs.
Waltermire, Jamie; Final Office Action for U.S. Appl. No. 17/538,795, filed Nov. 30, 2021, mailed Aug. 27, 2024, 51 pgs.
Waltermire, Jamie; Certificate of Correction for U.S. Appl. No. 17/497,054, filed Oct. 8, 2021, mailed Sep. 10, 2024, 1 pg.
Waltermire, Jamie; Non-Final Office Action for U.S. Appl. No. 18/197,300, filed May 15, 2023, mailed Aug. 28, 2024, 162 pgs.
Waltermire, Jamie; Non-final Office Action for U.S. Appl. No. 18/416,949, filed Jan. 19, 2024, mailed Sep. 26, 2024, 157 pgs.
Waltermire, Jamie; Requirement for Restriction/Election for U.S. Appl. No. 18/416,949, filed Jan. 19, 2024, mailed Aug. 5, 2024, 8 pgs.
Sollie, Greg; Notice of Allowance for U.S. Appl. No. 18/106,169, filed Feb. 6, 2023, mailed Jun. 7, 2024, 11 pgs.
Sollie, Greg; Certificate of Correction for U.S. Appl. No. 17/679,772, filed Feb. 24, 2022, mailed Jun. 4, 2024, 2 pgs.
Sollie, Greg; Non-Final Office Action for U.S. Appl. No. 18/517,626, filed Nov. 22, 2023, mailed Aug. 30, 2024, 159 pgs.
Sollie, Greg; Requirement for Restriction/Election for U.S. Appl. No. 18/517,626, filed Nov. 22, 2023, mailed Jun. 13, 2024, 6 pgs.
Sollie, Greg; Final Office Action for U.S. Appl. No. 17/536,878, filed Nov. 29, 2021, mailed Sep. 6, 2024, 38 pgs.
Sollie, Greg; Final Office Action for U.S. Appl. No. 18/140,641, filed Apr. 28, 2023, mailed Jun. 27, 2024, 19 pgs.
Sollie, Greg; Notice of Allowance for U.S. Appl. No. 17/901,558, filed Sep. 1, 2022, mailed Sep. 16, 2024, 28 pgs.
Sollie, Greg; Non-Final Office Action for U.S. Appl. No. 18/208,704, filed Jun. 12, 2023, mailed Sep. 13, 2024, 13 pgs.
Waltermire, Jamie; Examination Report for Australian Patent Application No. 2018260901, filed Nov. 8, 2018, mailed Jul. 18, 2024, 5 pgs.
Waltermire, Jamie; Notice of Acceptance of Patent Application for Australian Patent Application No. 2018260920, filed Nov. 8, 2018, mailed Aug. 16, 2024, 4 pgs.
Collison, Alan B.; Office Action for European Patent Application No. 23211653.3, filed Nov. 7, 2017, mailed Jul. 12, 2024, 3 pgs.
Collison, Alan B.; Advisory Action for U.S. Appl. No. 18/234,425, filed Aug. 16, 2023, mailed Nov. 15, 2024, 3 pgs.
Collison, Alan B.; Advisory Action for U.S. Appl. No. 18/234,425, filed Aug. 16, 2023, mailed Nov. 25, 2024, 2 pgs.
Collison, Alan B.; Applicant-Initiated Interview Summary for U.S. Appl. No. 18/612,835, filed Mar. 21, 2024, mailed Oct. 29, 2024, 2 pgs.
Waltermire, Jamie; Final Office Action for U.S. Appl. No. 18/115,791, filed Mar. 1, 2023, mailed Dec. 20, 2024, 28 pgs.
Waltermire, Jamie; Final Office Action for U.S. Appl. No. 17/173,293, filed Feb. 11, 2021, mailed Dec. 23, 2024, 22 pgs.
Waltermire, Jamie; Advisory Action for U.S. Appl. No. 17/538,795, filed Nov. 30, 2021, mailed Dec. 5, 2024, 3 pgs.
Sollie, Greg; Final Office Action for U.S. Appl. No. 18/517,626, filed Nov. 22, 2023, mailed Dec. 12, 2024, 16 pgs.
Sollie, Greg; Advisory Action for U.S. Appl. No. 17/536,878, filed Nov. 29, 2021, mailed Nov. 27, 2024, 14 pgs.
Waltermire, Jamie; Examination Report for Australian Patent Application No. 2024216411, filed Nov. 8, 2018, mailed Dec. 19, 2024, 4 pgs.
Sollie, Greg; Examination Report for Australian Patent Application No. 2023266362, filed Nov. 8, 2018, mailed Oct. 30, 2024, 4 pgs.
Collison, Alan B.; Examination Report for Australian Patent Application No. 2023203006, filed Nov. 7, 2017, mailed Nov. 27, 2024, 7 pgs.
Collison, Alan B.; Communication pursuant to Article 94(3) EPC for Application No. 23211653.3, filed Nov. 7, 2017, mailed Oct. 4, 2024, 3 pgs.
Waltermire, Jamie; Notice of Allowance for U.S. Appl. No. 18/416,948, filed Jan. 19, 2024, mailed Jan. 29, 2025, 23 pgs.
Waltermire, Jamie; Non-Final Office Action for U.S. Appl. No. 18/734,865, filed Jun. 5, 2024, mailed Jan. 24, 2025, 131 pgs.
Mp Global Products Llc; Examination Report for Canada Patent Application No. 3,218,319, mailed Dec. 23, 2021, 5 pgs.

(56) References Cited

OTHER PUBLICATIONS

Waltermire, Jamie; Notice of Allowance for U.S. Appl. No. 17/891,565, filed Aug. 19, 2022, mailed Jan. 2, 2025, 18 pgs.
Waltermire, Jamie; Applicant-Initiated Interview Summary for U.S. Appl. No. 18/115,791, filed Mar. 1, 2023, mailed Feb. 14, 2025, 3 pgs.
Waltermire, Jamie; Final Office Action for U.S. Appl. No. 17/127,060, filed Dec. 18, 2020, mailed Jan. 24, 2025, 24 pgs.
Waltermire, Jamie; Non-Final Office Action for U.S. Appl. No. 18/385,726, filed Oct. 31, 2023, mailed Jan. 30, 2025, 16 pgs.
Waltermire, Jamie; Non-Final Office Action for U.S. Appl. No. 17/538,795, filed Nov. 30, 2021, mailed Feb. 4, 2025, 33 pgs.
Waltermire, Jamie; Final Office Action for U.S. Appl. No. 18/197,300, filed May 15, 2023, mailed Jan. 13, 2025, 22 pgs.
Waltermire, Jamie; Notice of Allowance for U.S. Appl. No. 18/416,949, filed Jan. 19, 2024, mailed Jan. 27, 2025, 25 pgs.
Sollie, Greg; Non-Final Office Action for U.S. Appl. No. 17/536,878, filed Nov. 29, 2021, mailed Dec. 30, 2024, 25 pgs.
Sollie, Greg; Certificate of Correction for U.S. Appl. No. 18/094,806, filed Jan. 9, 2023, mailed Dec. 31, 2024, 4 pgs.
Sollie, Greg; Notice of Allowance for U.S. Appl. No. 18/208,704, filed Jun. 12, 2023, mailed Jan. 2, 2025, 26 pgs.
Sollie, Greg; Certificate of Correction for U.S. Appl. No. 18/208,708, filed Jun. 12, 2023, mailed Jan. 21, 2025, 1 pg.
Sollie, Greg; Certificate of Correction for U.S. Appl. No. 18/208,709, filed Jun. 12, 2023, mailed Jan. 21, 2025, 1 pg.
Sollie, Greg; Examination Report for Australian Application No. 2023285920, filed Nov. 8, 2018, mailed Jan. 16, 2025, 4 pgs.
Sollie, Greg; Examination Report for Australian Patent Application No. 2023285879, filed Nov. 8, 2018, mailed Jan. 14, 2025, 3 pgs.
Collison, Alan B.; Notice of Allowance for Canadian Patent Application No. 3,176,052, filed Nov. 7, 2017, mailed Feb. 6, 2025, 1 pgs.

* cited by examiner

STARCH-CELLULOSE COMPOSITE MATERIAL

CROSS-REFERENCE TO RELATED APPLICATIONS

This application claims the benefit of U.S. Provisional Application No. 63/148,474, filed on Feb. 11, 2021, which is hereby incorporated by reference in its entirety.

TECHNICAL FIELD

This disclosure relates to a material. More specifically, this disclosure relates to a composite material.

BACKGROUND

Packaging and shipping temperature sensitive contents can pose challenges. The contents can spoil, destabilize, freeze, melt, or evaporate during storage or shipping if the temperature of the contents is not maintained or the packaging is not protected from hot or cold environmental conditions. In applications such as hot food delivery, customers can be dissatisfied if the contents have cooled to ambient temperature upon delivery. Contents such as food, pharmaceuticals, electronics, or other temperature sensitive items can be damaged if exposed to temperature extremes. Many insulated packages are bulky and difficult to store prior to use. Additionally, many insulated packages are specialized to ship or carry hot goods, chilled goods, or frozen goods, and shippers must maintain large stocks of specialized packaging for each application.

In addition, many insulated packages cannot be recycled and are often disposed of in landfills. Many insulation products that are touted as being environmentally friendly are more harmful to the environment than is readily apparent. For example, many insulation products are often advertised as being readily recyclable; however, these products are frequently not "curbside recyclable" wherein the materials can simply be placed in a recycling bin by the consumer at the time of discard. Instead, many of these recyclable materials must be physically separate into component parts, such as separating fiber-based insulations from plastic lining films, which then must be sent to separate recycling streams. If the end-user fails to comply with these requirements, these "recyclable" materials will still be sent to a landfill.

Also, many materials that are made from recycled materials have no further life after being used as packaging. For example, denim, wool, and other fiber materials are often recycled from clothing or other textiles to make insulation. However, the insulation itself is no longer recyclable and has no additional value. Instead, it is usually thrown away. While materials such as cotton, wool, and other natural fibers are often regarded as biodegradable under some circumstances, these products are not biodegradable on a helpful time scale when enclosed in plastic garbage bags and buried in an anaerobic environment, such as a landfill.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a composite comprising cellulose fiber; and foam binding the cellulose fiber.

Also disclosed is a method for manufacturing a composite, the method comprising mixing a plurality of ingredients to form a pre-foam mixture; foaming the pre-foam mixture to produce a foam; mixing the foam with cellulose fiber to form a composite material; and curing the composite material.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
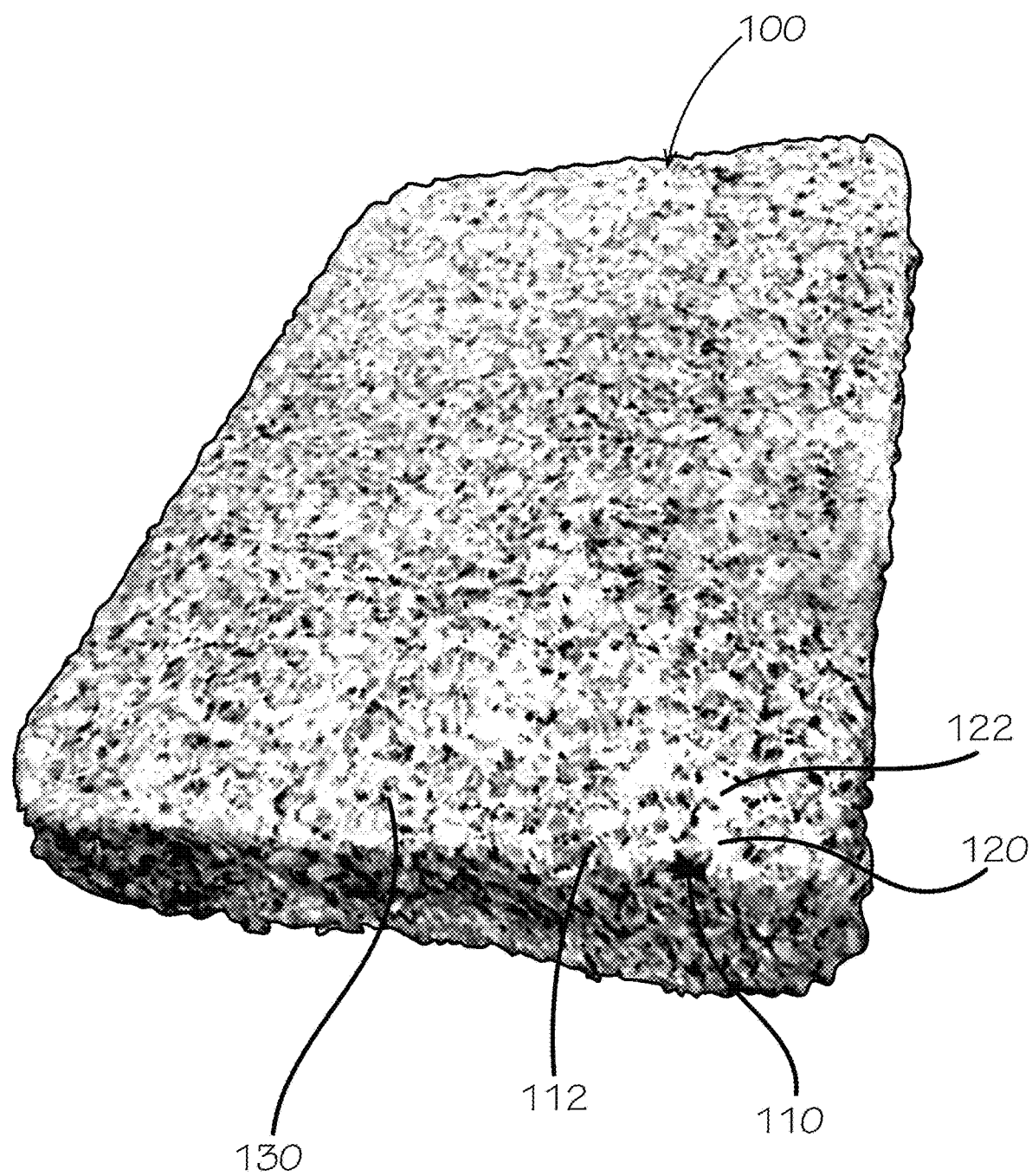
FIG. 1 is a perspective view of a composite comprising cellulose and foam in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a composite material and associated methods, systems, devices, and various apparatus. The composite material can comprise cellulose fiber and foam. It would be understood by one of skill in the art that the composite material is described in but a few exemplary embodiments among many. No particular terminology or description should be considered limiting on the disclosure or the scope of any claims issuing therefrom.

FIG. 1 is a perspective view of a composite material 100 in accordance with one aspect of the present disclosure. The composite material 100 can comprise cellulose 110 and foam 120. The composite material 100 can be produced through a series of manufacturing steps. In a first step, a pre-foam mixture 200 (shown in FIG. 2) can be formed, which is discussed below in greater detail with respect to FIGS. 2, 3, 8, and 9. In a second step, the pre-foam mixture 200 can be processed to create the foam 120, sometimes referred to simply as a "foaming" step, as discussed in greater detail below with respect to FIGS. 4-6, 8, and 9. In a third step, the cellulose 110 can be mixed into the foam 120 to create an uncured form of the composite material 100, in a process that can involve a single or multiple stages, as discussed with respect to FIGS. 8 and 9.

Figure 7:
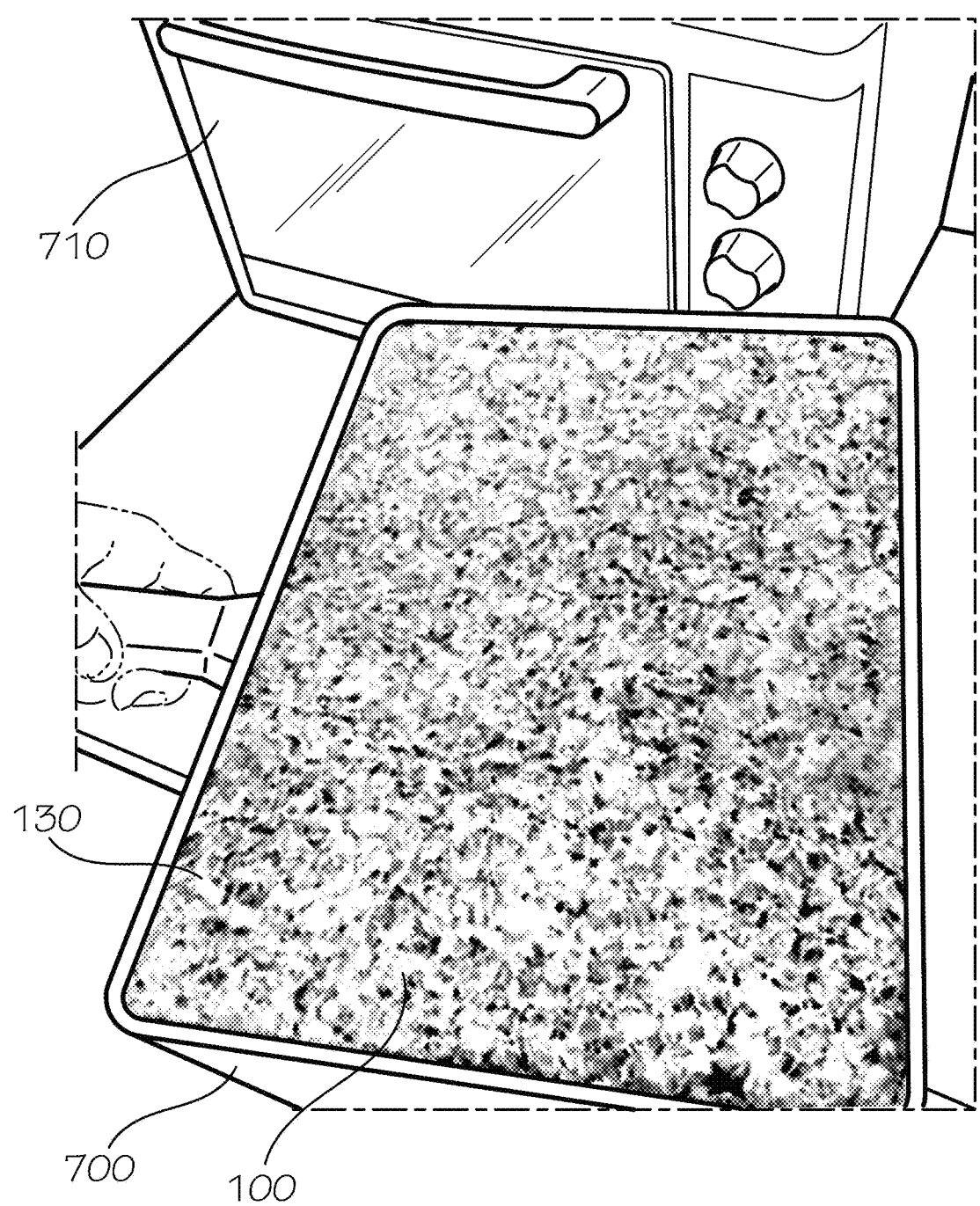
FIG. 7 is a front perspective view of a step for curing the composite of FIG. 1 in an oven.
Figure 8:
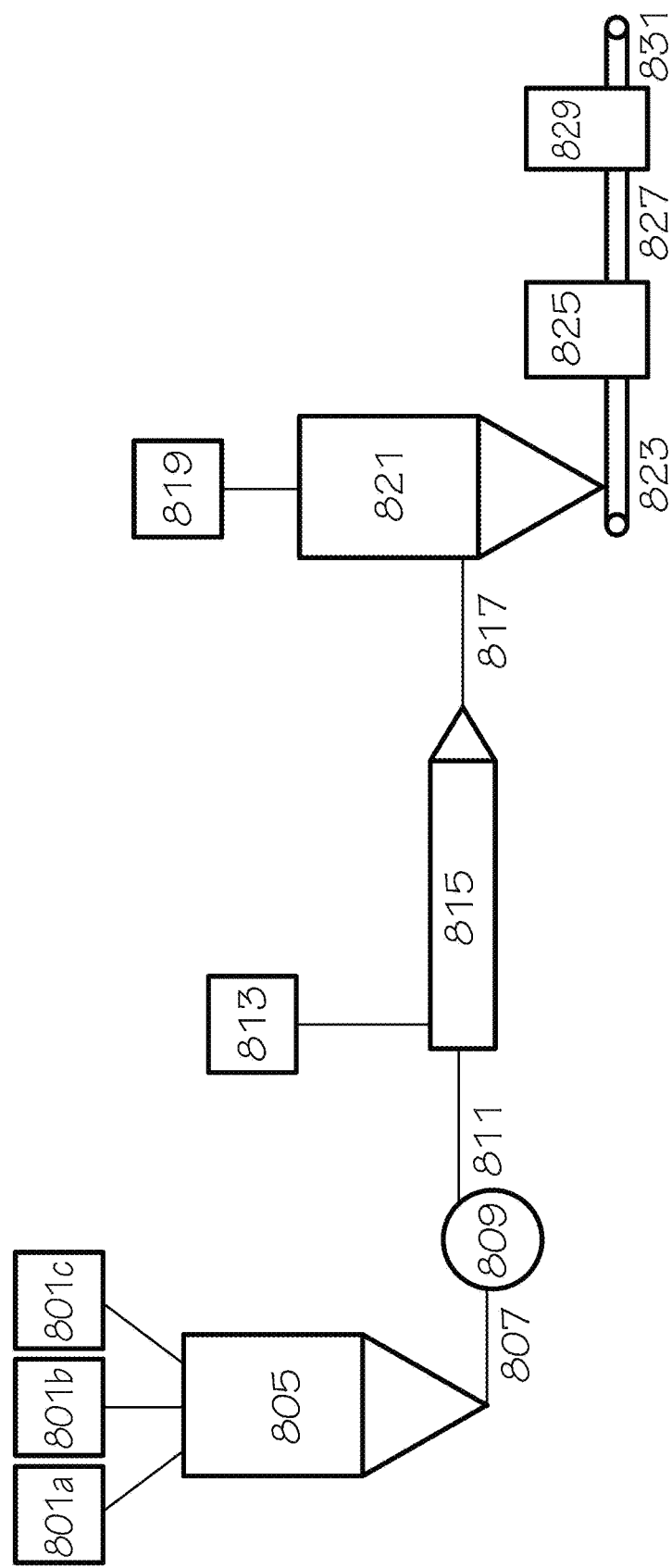
FIG. 8 is a process schematic illustrating one aspect of an industrial process for producing the composite material 100 in accordance with another aspect of the present disclosure.
Figure 9:
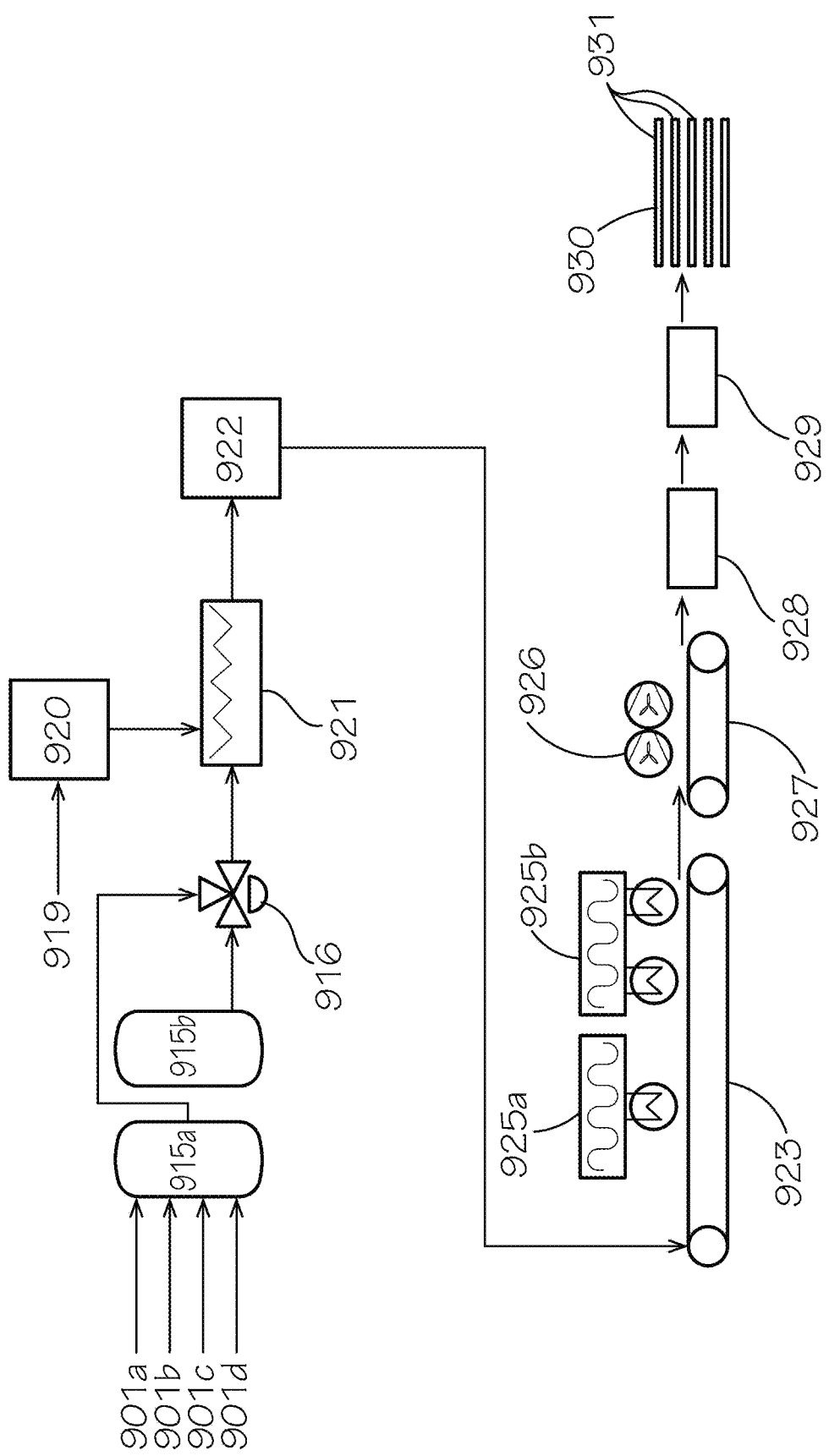
FIG. 9 is a process schematic illustrating another aspect of an industrial process for producing the composite material 100 in accordance with another aspect of the present disclosure.

In the final two steps, which can take place in either order or, at times, simultaneously, the uncured composite material 100 can be shaped and cured, as described in greater detail with respect to FIGS. 7-9. For example, in some aspects, the uncured composite material 100 can be deposited in a mold 700 (shown in FIG. 7) and then cured, such as by baking in an oven 710 (shown in FIG. 7) or microwave, passing through a heating tunnel, or curing through any other suitable process, for example and without limitation. As the composite material 100 cures, the foam 120 and the cellulose 110 can dry out and harden. In some aspects, the foam 120 and the cellulose 110 can bond together through mechanisms such as hydrogen bonding, surface bond adhesion, or other bonding mechanisms.

In some aspects, uncured composite material 100 can be cured without a precisely defined form, such as by depositing, or extruding, the uncured composite material 100 on a conveyor mechanism and then passing the uncured composite material 100 through or under a curing unit in a continuous or batch operation, such as an oven, infrared lamp, heated blower, ultrasonic dryer, vacuum dryer, microwave heater, or other suitable curing mechanism or combinations thereof, thereby producing cured composite material 100 in a raw, or unformed, state. The unformed composite material 100 can then be shaped, such as by cutting, milling, stamping, or any other suitable shaping process or processes. In some aspects, the composite material 100 can be simultaneously shaped and cured. For example and without limitation, the uncured material can be simultaneously extruded and cured. Such processes can be used to produce elongated forms, sheets, or loose shapes, such as packing peanuts, for example and without limitation.

In some aspects, the shaping process(es) can produce basic raw material shapes, such as sheets, boards, blocks, bricks, or elongated stock, for example and without limitation. In some aspects, the shaping process(es) can produce finished or semi-finished products with shapes of varying degrees of intricacy. For example and without limitation, the shaping steps can produce a core for a cooler lid or body, a finished cooler lid or body, drink koozies, custom-formed shipping inserts, egg cartons or other food/beverage containers, padded inserts for safety equipment such as helmets, building materials such as doors, cabinet panels, or shelves, or any other suitable product usage.

Various exemplary aspects of the overall process at an industrial scale are described below with respect to FIGS. 8 and 9.

Returning to FIG. 1, the cellulose 110 can be in the form of cellulose fiber 112, and the foam 120 can bind the cellulose fiber 112 together. The cellulose fiber 112 can be individual fibers or pieces comprising multiple fibers. In the present aspect, the composite material 100 can be shaped to form a batt 130, such as an insulation batt, for example and without limitation. In some aspects, the composite material 100 can provide an insulation R-value of approximately 3-4 per inch of material thickness. In some aspects, composite material 100 can be utilized as a structural material, acoustic insulation, or other purpose, as described below in greater detail.

The cellulose fiber 112 can be recycled fiber. For example and without limitation, the cellulose fiber 112 can be derived from recycled paper and cardboard products. In some aspects, these materials can be shredded, such as to form strips or irregular and varied shapes. In some aspects, waste materials from the manufacture of paper and pulp-based products can be utilized as a source of cellulose fiber 112. For example and without limitation, edge trim from a paper mill can be utilized. Edge trim is a waste product from paper manufacturing and conversion wherein the edge of sheets are trimmed off. In some aspects, the edge trim can be put through a grinder to obtain pieces of cellulose fiber 112 at a desired size or range of sizes. In some aspects, pieces of cellulose fiber 112 can exceed about 13 mm. In some aspects, pieces of cellulose fiber 112 can be approximate 0.2 mm or less in size. In some aspects, the waste from a box plant can be utilized, such as the leftovers portions after die cutting a corrugate blank, for example and without limitation.

In some aspects, the cellulose fiber 112 can be virgin material. For example and without limitation, the cellulose fiber 112 can be derived from wood or other plant or tree products. In some aspects, the cellulose fiber 112 can be chopped to shorten the cellulose fiber 112 or produce a uniform range of lengths. For example and without limitation, the cellulose fiber 112 can be cut to sizes such as 1" by 0.5" in size or less. In some aspects, the cellulose fiber 112 can be 0.5" by 0.25" in size or less. In some aspects, the cellulose fiber 112 can be the type of cellulose fiber used for blown insulation installation, such as the cellulose insulation sold as Nu-Wool® by Nu-Wool Co., Inc. of Jenison, Michigan.

In some aspects, the cellulose fiber 112 can come from a waste source, such as sawdust from the lumber and/or wood manufacturing industries or ultra-short fiber rejects from the paper product manufacturing industry. These sources of cellulose fiber 112 can be utilized to form aspects of the composite material 100 that can be suited for manufacturing low-density paneling or very high-density flame logs, for example and without limitation. Normally, ultra-short cellulose fiber that is too short for making paper or cardboard is burned in a furnace, but these fibers can be utilized for forming the composite material 100, thereby extending the re-useable lifespan of cellulosic materials. A range of useful lengths of the cellulose fiber 112 for making the composite material 100 can be from less than a hundredth of an inch (0.01") to several inches in length. In some aspects, some or all of the cellulose fibers 112 can be up to or exceeding a foot (12") in length. In some aspects, some or all of the cellulosic fibers 112 can be up to or exceeding a yard (36") in length.

The foam 120 can comprise starch 122. In some aspects, the starch 122 can be un-gelatinized corn starch. In some aspects, the starch 122 can be modified starch. In some aspects, the foam 120 can be predominantly starch-based. The foam 120 can comprise additives in addition to the starch. The foam 120 can be formed by premixing the materials, such as starch and additives, to form the pre-foam mixture 200. In one aspect, the pre-foam mixture 200 can comprise by volume the following ingredients:

| Water | 1800 ml | ~73.2% |
|---|---|---|
| Starch | 300 ml | ~12.2% |
| Liquid egg whites | 200 ml | ~8.1% |
| Polyvinyl acetate (PVA) glue | 120 ml | ~4.9% |
| Sodium Laureth Sulfate (27% Solution) | 35 ml | ~1.4% |
| Baking soda | 2.5 ml | ~0.1% |
| Citric acid | 2.5 ml | ~0.1% |

In one aspect, this composition of the pre-foam mixture 200 can be combined with 9500 ml (~360 g) of pulp (cellulose fiber 112) after the pre-foam mixture 200 has been foamed. In other aspects, the proportions of the ingredients can be significantly altered, and/or some ingredients can be omitted. For example and without limitation, the proportions of water and starch can be individually increased or decreased by 20% or more from the indicated percentage. To illustrate, the percentage of starch 122 by volume can be from ~9.9% (a 20% decrease) to ~14.9% (a 20% increase). Particularly in structural applications of the composite material 100, the percentage of starch 122 can be increased by up to 100% or more. The ratio of the pre-foam mixture 200 mixed with the cellulose 110 can also greatly vary. In some aspects, the PVA glue can be omitted. In some aspects, gelatin, agar, and/or other adhesives can be utilized in place of PVA glue. In some aspects, such as those without the PVA glue for example and without limitation, the percentage of starch 122 can be increased, and/or the pre-foam mixture 200 can comprise gelatinized starch. In some aspects, baking soda can be omitted. In some aspects, such as those omitting the baking soda for example and without limitation, the pre-foam mixture 200 can comprise baking powder. In some aspects, the liquid egg whites can be omitted. In some aspects, such as those omitting the liquid egg whites for example and without limitation, the pre-foam mixture 200 can comprise anhydrous (dry) egg whites and/or gluten protein. In some aspects, boric acid or another suitable material can be added to the pre-foam mixture 200, which can prevent mold and other biologic infestations.

In some aspects, the pre-foam mixture 200 can comprise sodium laureth sulfate, starch, sodium bicarbonate, and/or egg whites. In some aspects, the pre-foam mixture 200 can comprise sodium coco sulfate, PVA glue, silica, and/or xanthan gum. In some aspects, sodium coco sulfate can be utilized in place of sodium laureth sulfate. In some aspects, the pre-foam mixture 200 can comprise methyl cellulose, ethyl cellulose, and/or hydroxypropyl methyl cellulose.

For example and without limitation, in some aspects, the pre-foam mixture 200 can exclude starch. In one starchless aspect, the pre-foam mixture 200 can comprise the following ingredients by weight:

| | |
|---|---|
| Water | ~1000 g |
| Liquid PVA Glue (20% PVA Solution) | ~75 g (Range: 25 g-100 g) |
| Water: | ~60 g |
| PVA: | ~15 g |
| Sodium Coco Sulfate | ~1 g (Range: 0.5 g-5 g) |
| Xanthan Gum | ~3 g (Range: 1 g-10 g) |
| Hydrated Hydroxypropyl Methyl Cellulose: | |
| Hydroxypropyl Methyl Cellulose | ~2 g (Range: 0 g-10 g) |
| Water | ~18 g |
| Total | ~1100 g |

In some aspects, approximately 4 gallons of foam 120 can be generated from 1100 g of the pre-foam mixture 200 prepared according to the above formulation. In some aspects, approximately 4 gallons of the foam 120 can be combined with the cellulose fiber 112 to generate approximately 2 square feet of composite material 100, which at a thickness of 1" can define a mass of 110 g per square foot (~1184 grams per square meter (GSM)), in some aspects.

In some aspects, a dry formulation of the pre-foam mixture 200 can be prepared, which can include the cellulose fiber 112 prior to adding water and foaming the mixture. One aspect of the dry formulation can comprise the following:

| | |
|---|---|
| PVA | ~15 g |
| Sodium Coco Sulfate | ~3 g |
| Xanthan Gum | ~2 g |
| Hydroxypropyl Methyl Cellulose | ~2 g |
| Total | ~147 g |

Approximately 1000-1100 g of water (preferably about 1078 g of water) can be added to the dry formulation to create the pre-foam mixture 200, which can then be foamed. Once foamed, approximately 125 g of fiber can be added to the foam 120 to produce uncured composite material 100.

Figure 2:
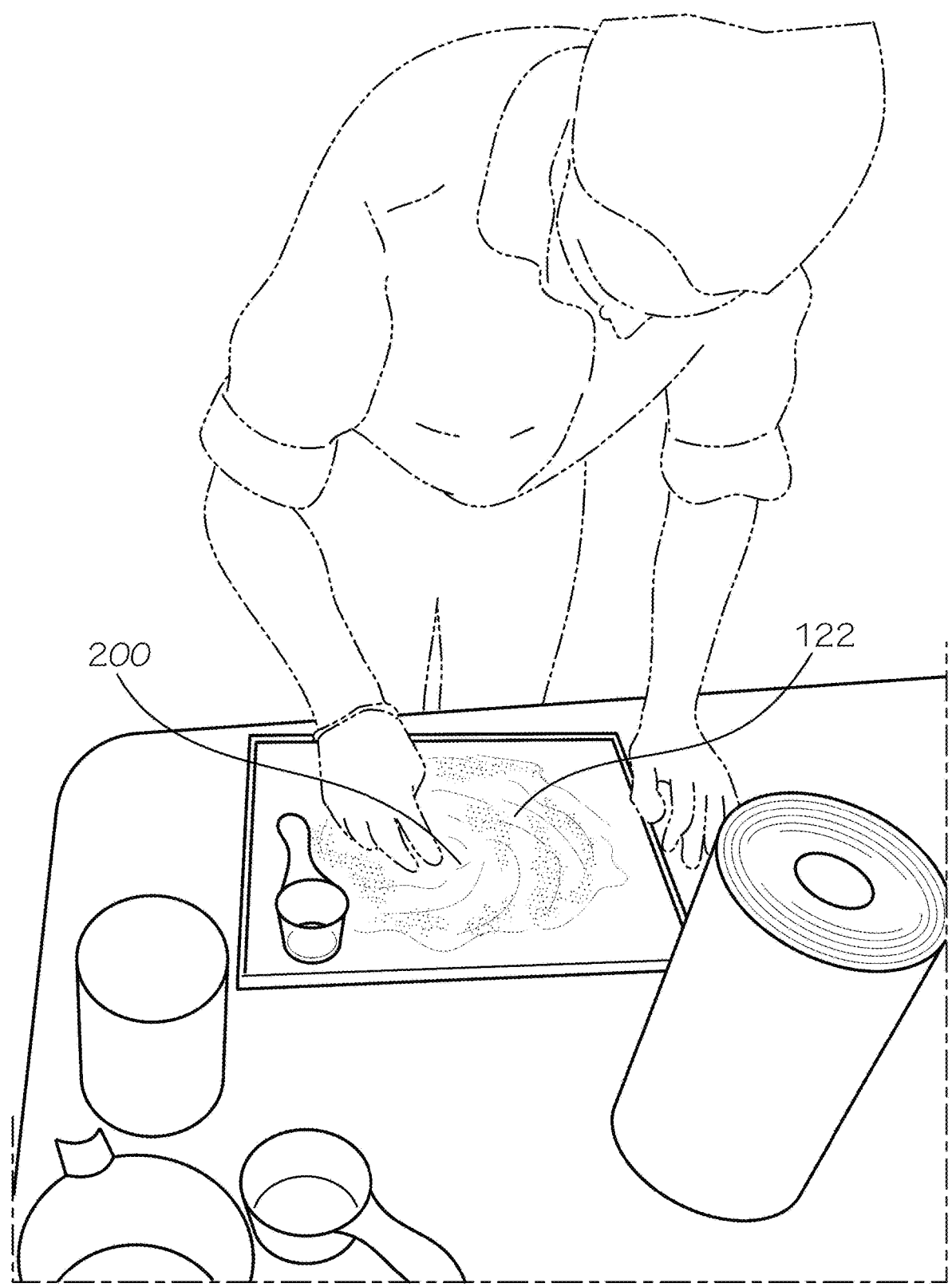
FIG. 2 is a perspective view of a step in forming a mixture comprising starch in accordance with another aspect of the present disclosure.
Figure 3:
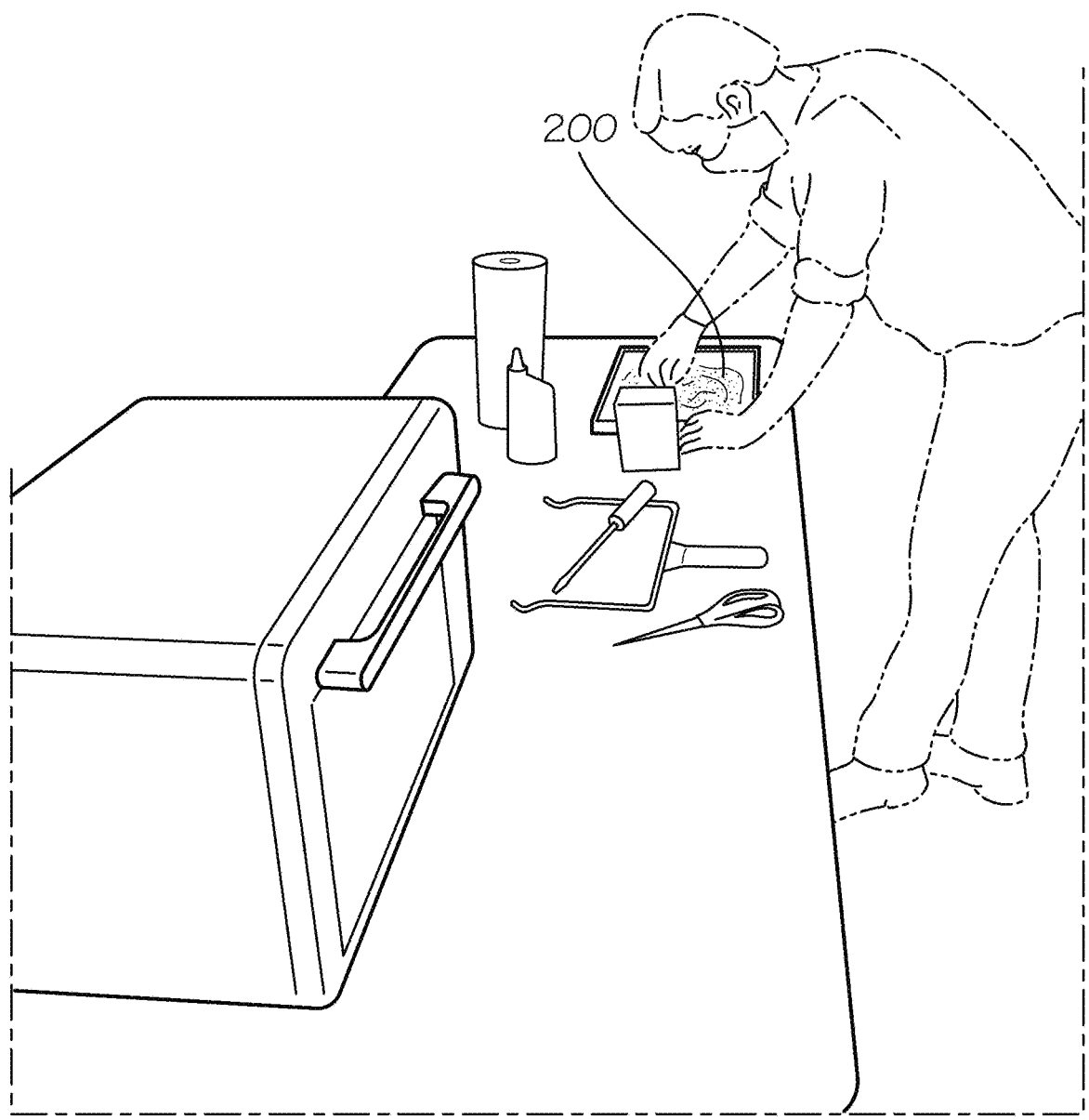
FIG. 3 is a side view of the step in forming the mixture of FIG. 2.

FIGS. 2 and 3 demonstrate a step in mixing the pre-foam mixture 200. The materials can be pre-mixed in an external setting, as shown. In some aspects, such as external settings, the materials can be mixed to form the pre-foam mixture 200 in large batches or in a continuous process. In some aspects, mixing can be accomplished in multiple phases where different ingredients, or portions of ingredients, are added in separate steps.

Figure 4:
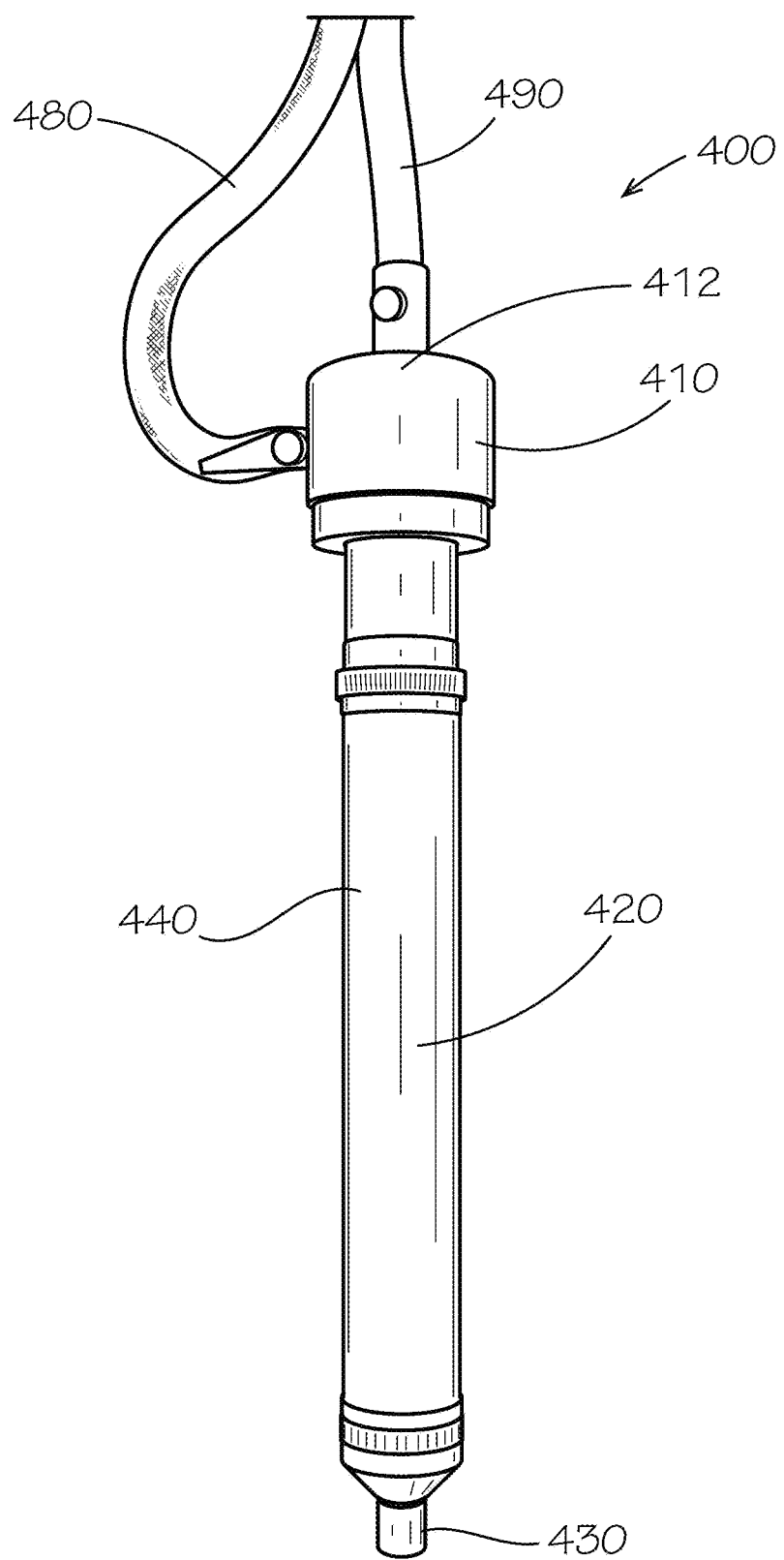
FIG. 4 is a front view of a wand of a foam generator in accordance with another aspect of the present disclosure.

Once mixed, the pre-foam mixture 200 can be placed in a foam generator 400 (shown in FIGS. 4-6) to create the foam 120 (shown in FIG. 1). The foam generator 400 can comprise a wand 410 (shown in FIG. 4), a reservoir 500 (shown in FIGS. 5 and 6), a mixture conduit 480 (shown in FIGS. 4 and 6), and an air conduit 490 (shown in FIGS. 4 and 6). The wand 410 can comprise a mixing chamber 412 at one end of the wand 410 and an outlet nozzle 430 at an opposite end of the wand 410. A foam generation conduit 420 can extend from the mixing chamber 412 to the outlet nozzle 430. The foam generation conduit 420 can be at least partially filled with foam generation media 440, which is visible within the foam generation conduit 420 because the foam generation conduit 420 can optionally be transparent, as shown in FIG. 4. The foam generation media 440 can be steel wool in the present aspect; however, in other aspects, different media can be utilized.

Figure 5:
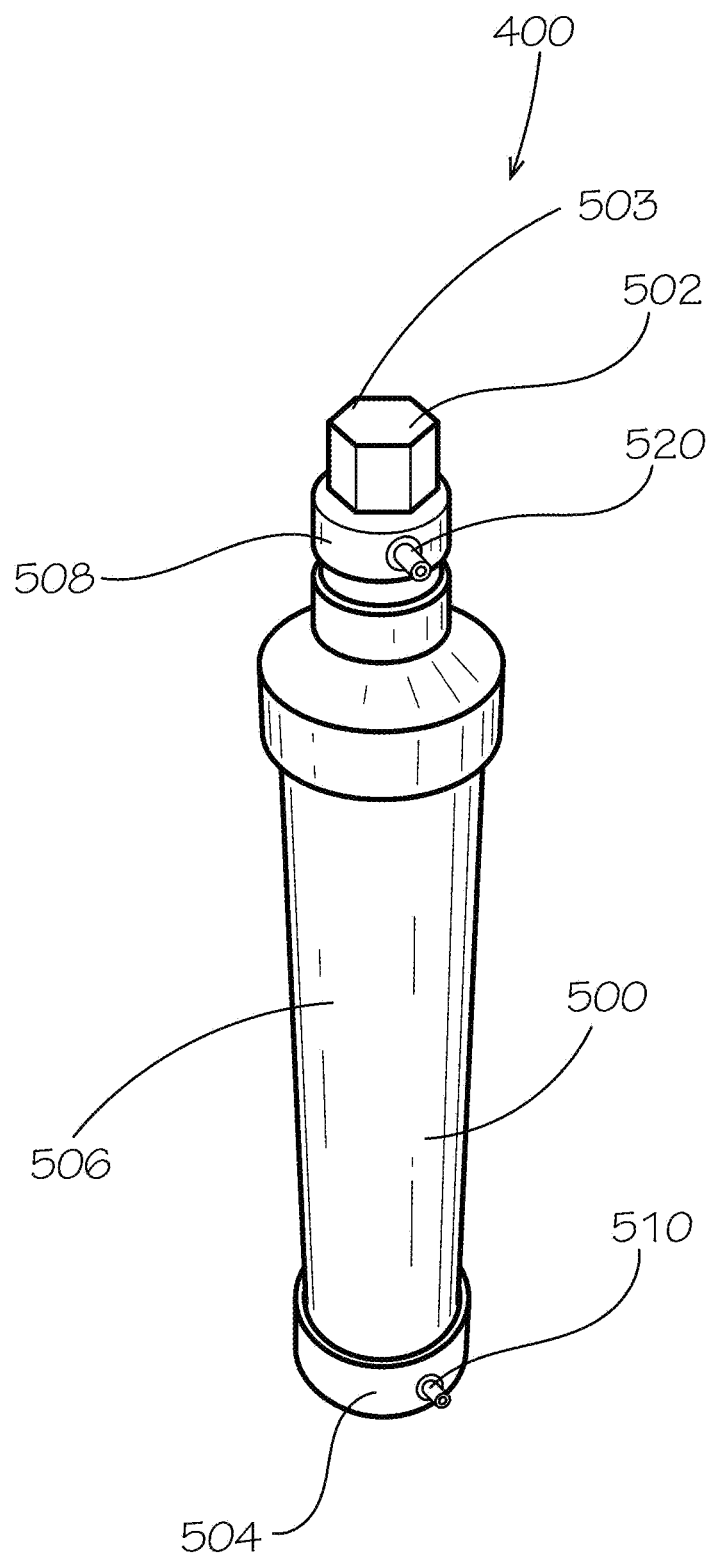
FIG. 5 is a front view of a reservoir of the foam generator of FIG. 4.

Turning to FIG. 5, the reservoir 500 can define a first end 502 and a second end 504. A removable fill cap 503 of the reservoir 500 can be positioned at the first end 502. The reservoir 500 can comprise a neck 508 extending between the fill cap 503 and a main body 506 of the reservoir 500, which can define the second end 504. The main body 506 can define an outlet 510 at the second end 504. The neck 508 can define an inlet 520. The main body 506 can be filled with the pre-foam mixture 200 (shown in FIG. 2) by removing the fill cap 503 and pouring the pre-foam mixture 200 into the neck 508.

Figure 6:
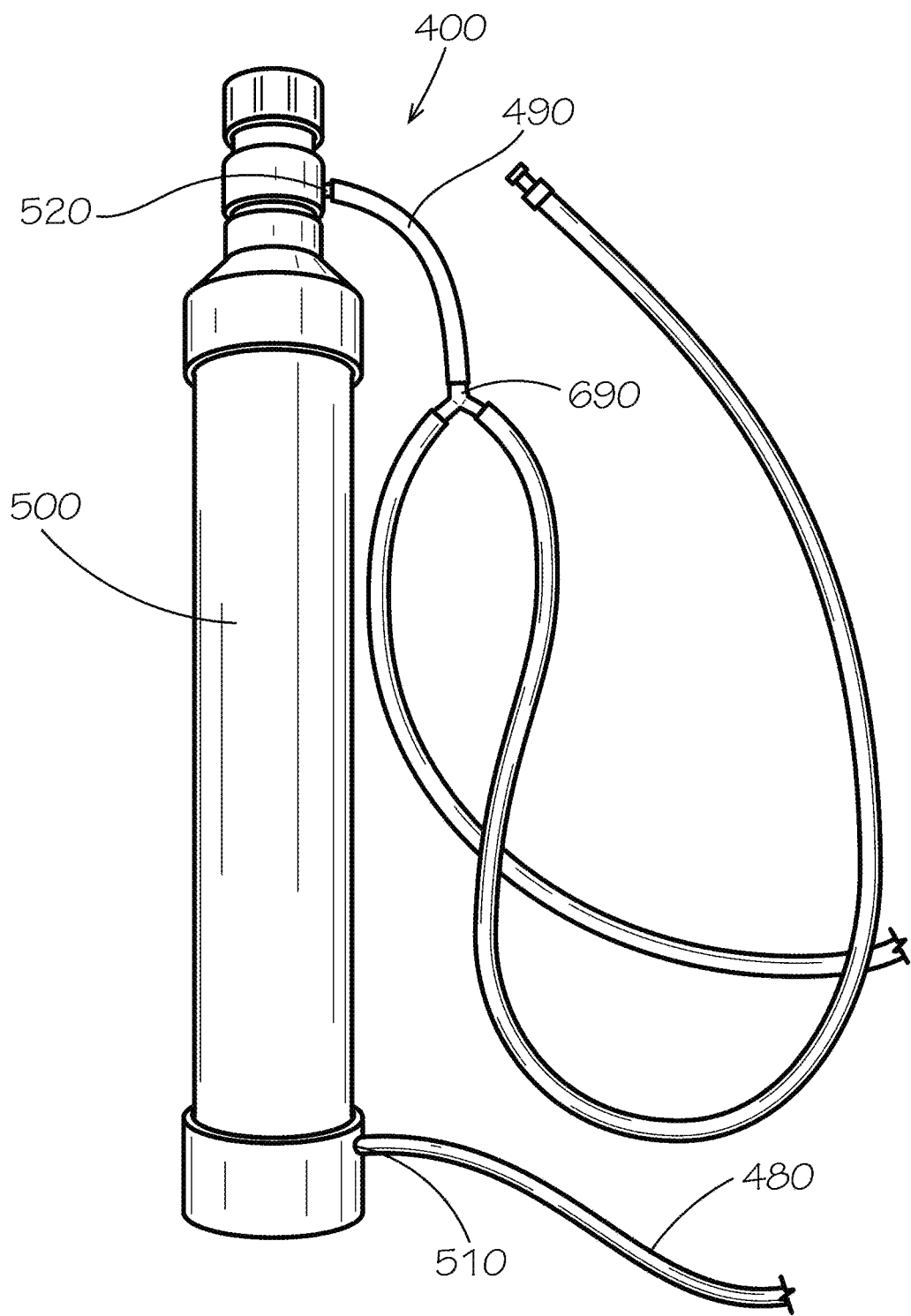
FIG. 6 is a front view of a reservoir of the foam generator of FIG. 4.

Turning to FIG. 6, one arm of the air conduit 490 can be coupled to the inlet 520, and the mixture conduit 480 can be coupled to the outlet 510. The conduits 480,490 can comprise materials such as tubing, hoses, piping, or any other suitable material capable of transporting a pressurized fluid. The air conduit 490 can supply pressurized air to the reservoir 500, which can force the pre-foam mixture 200 (shown in FIG. 2) out from the outlet 510 to the mixture conduit 480.

Returning to FIG. 4, the mixture conduit 480 can feed the pre-foam mixture 200 into the mixing chamber 412 of the wand 410, and the air conduit 490 can feed compressed air into the mixing chamber 412. The flow of compressed air into the mixing chamber 412 can force the pre-foam mixture 200 through the foam generation media 440, thereby creating the foam 120 by entrapping the air within bubbles formed from the pre-foam mixture 200, which can then be sprayed out of the outlet nozzle 430.

A splitting valve 690 (shown in FIG. 6) in the air conduit 490 can control the ratio of air flowing to the reservoir 500 and to the wand 410. Supplying more air to the reservoir 500 can increase the ratio of the pre-foam mixture 200 to the air supplied to the wand 410, thereby resulting in a more watery, denser foam 120. Decreasing the air supplied to the reservoir 500 can decrease the ratio of the pre-foam mixture 200 to the air supplied to the wand 410, thereby resulting in a fluffier, less dense foam 120. For example and without limitation, a denser foam 120 can be desirable for producing a stronger composite material 100, such as for structural uses. A lighter foam 120 can be desirable for insulation applications, or where using less materials is desirable, such as creating loose filler, such as packing peanuts, from the composite material 100.

For example and without limitation, the pre-foam mixture 200 can define a density of approximately 1 to 1.1 g/ml. In some aspects, 1100 ml of pre-foam mixture 200 can be foamed to form about 4 gallons (about 15,141.6 ml) of the foam 120. The density of the pre-foam mixture 200 can be approximately 13-14 times greater than the density of the foam 120.

Once the foam 120 is formed, the foam 120 and the cellulose 110 (shown in FIG. 1) can be mixed together to form the composite material 100. For example and without limitation, the foam 120 and the cellulose 110, in the form of the cellulose fiber 112, can be mixed together in equal parts by volume in a container and stirred, such as with a mixing auger. In some aspects, the container can be a 5 gallon bucket. In other aspects, a mixing vessel, such as an industrial mixer, can be used to form the composite material 100. In some aspects, approximately 140-180 g of cellulose fiber 112 can be added to 1100 g of the foam 120. The resulting mixture can define a density of about 75-100 g/500 ml.

After mixing the composite material 100, the uncured composite material 100 can be cured, such as by cooking or baking the uncured composite material 100, to create solid forms of varying consistencies. For example and without limitation, the uncured composite material 100 can be baked at 350 degrees Fahrenheit to cure the composite material 100. In other aspects, the composite material 100 can be cured at higher or lower curing temperatures. For example and without limitation, the composite material 100 can be heated to a temperature of 270 degrees Fahrenheit or greater, which can steam sterilize the composite material 100. Steam sterilization can be particularly desirable in aspects of the composite material 100 comprising starch and/or protein(s). For example and without limitation, a tunnel microwave can be utilized to cure a 0.75" thick piece of composite material 100 over a period of 720 seconds at 38 kW output.

FIG. 7 demonstrates one alternative for curing the composite material 100 wherein the composite material 100 can be placed in the mold 700, such as a pan, and the composite material 100 can then be baked in the oven 710 to cure the composite material 100. The step shown can be an example of batch curing, wherein a set quantity of composite material 100 is cured in a discrete step. In the example shown in FIG. 7, once the composite material 100 has cured, the batt 130 of FIG. 1 can be formed. The degree to which the foam 120 and cellulose fiber 112 are mixed prior to curing can control the amount of air trapped into the uncured composite material 100, which can in turn affect the degree to which the foam 120 expands when the composite material 100 is cured.

Additionally, the degree to which the foam 120 expands as the composite material 100 cures can also be controlled by the curing method. The composite material 100 can be cured with the oven 710, as shown, a microwave, a dehydrator, an ultrasonic dryer, an air dryer, or an infrared heater, for example and without limitation. In some aspects, the composite material 100 can be cured in a continuous process (as opposed to batch curing), such as by passing the composite material 100 on a conveyor under an industrial heater, for example and without limitation.

The oven 710, dehydrator, and air dryer can be optimized for maintaining a shape of the composite material 100 while curing without further expansion of the foam 120 component, particularly when utilizing the mold 700. The mold 700 shown can be an open mold; however, in other aspects, a closed mold can be utilized which fully encloses the composite material 100, with the exception of one or more vent holes or filling holes, to control the final shape of the composite material 100. Through oven cooking, in some aspects, the composite material 100 can be formed into sheets of insulation with density as low as 57,000 grams per cubic meter, equating to approximately 1450 grams per square meter for a 1"-thick panel. In some aspects, oven cooking can be used to mold the composite material 100, as shown with mold 700, to different shapes and/or thicknesses.

The microwave can heat and expand both air and water molecules trapped in the uncured composite material 100, causing the foam 120 component of the composite material 100 to expand and more bubbles to be formed within the foam 120. In particular, the starch 122 portion of the foam 120 can expand and create a more rigid structure as well as to expand to fit a larger mold. The formulation of the composite material 100 can be the same for both the oven-cooked and micro-wave cooked aspects; however, because of the increased expansion of the foam 120 component of the composite material 100, even lower densities can be achieved than 41,500 grams per cubic meter. In some aspects, the average bubble, or pore, diameter in cured foam 120 can be approximately 1-2 mm. In some aspects, the bubbles, or pores, can have a maximum diameter of about 3 mm.

The low densities achieved can be desirable for forming insulation products from the composite material 100. In other aspects, the proportion of starch 122 in the composite material 100 can be increased to increase the rigidity of the composite material 100. In some aspects, a ratio of glue, such as PVA for example and without limitation, to cellulose fiber 112 can be altered to affect the rigidity of the composite material 100. Generally, a higher glue-to-fiber ratio by weight can make the composite material 100 harder, while a lower glue-to-fiber ratio by weight can make the composite material 100 softer. For example and without limitation, a 0.75:1 ratio by weight of PVA to cellulose fiber 112 can produce a very firm composite material 100, which can be similar to sheetrock. This can be desirable for making structural products from the composite material 100, similar to that of plywood or medium density fiberboard (MDF). The ultra-short waste cellulose fibers referenced above can be well-suited for use with the high-starch formulation for making structural products. In some aspects, the structurally-oriented formulations of the composite material 100 can be suitable for machining, such as to create furniture, cabinetry, or ornamentally shaped products, for example and without limitation. A length of the cellulose fiber 112 can also affect the rigidity of the composite material 100. For example and without limitation, longer fiber lengths of the cellulose fiber 112 can increase pliability of the composite material 100.

Regardless of cooking method, the composite material 100 can be non-toxic. Additionally, the composite material 100 can be fully recyclable, including single-stream recyclable, and repulpable. In the present aspect, the composite material 100 and all components thereof can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, IL which is hereby incorporated in its entirety.

When repulped, virtually all of the cellulose 110 can be recovered, allowing for multiple reuses. The starch 122 can be water soluble, and the additives in the foam 120 can be water based, so the foam 120 component can disintegrate during repulping. Additionally, due to the porous nature of the foam 120, the weight of the starch 122 and additives in a given volume of the composite material 100 is low, so these materials can comprise a relatively small portion of the composite material 100 by weight, leaving a greater percentage of the composite material 100 to be from the cellulose 110. This can aid the composite material 100 in breaking down rapidly enough in a paper mill to not cause adverse effects in repulping and manufacturing of recycled paper products. Based on the properties of the foam 120 and its additives, the rate at which the composite material 100 comes apart during repulping can be controlled. In particular, the percentage of starch 122 in the composite material 100 can be altered to optimize pulp recovery during the repulping process.

FIG. 8 is a process schematic illustrating one aspect of an industrial process for producing the composite material 100 in accordance with another aspect of the present disclosure.

In some aspects, water, starch 122, and additives can be fed into a first mixing vessel 805 from various storage vessels, or tanks, 801a, b, c. The number of vessels 801a, b,

*c* should not be viewed as limiting, and the number of vessels 801*a, b, c* may vary according to the number of separate ingredients being combined to form the pre-foam mixture 200. In a continuous production process, the ingredients of the pre-foam mixture 200 can be fed at controlled rates into the first mixing vessel 805 to achieve consistent compositions. In other aspects, such as a batch process, some or all of the ingredients can be fed into the first mixing vessel 805 by manually measuring and dumping the ingredients into the first mixing vessel 805.

In some aspects, the first mixing vessel 805 can be a dynamic mixing vessel 805 that can stir or mix the ingredients until the mixture is substantially homogenous before feeding the pre-foam mixture 200 into a first mixture conduit 807. The first mixture conduit 807 can feed the pre-foam mixture 200 to a pump 809, which can pressurize the pre-foam mixture 200 and feed the pre-foam mixture 200 through a second mixture conduit 811 to a foaming vessel 815. In some aspects, the pump 809 may not be necessary, and the pre-foam mixture 200 can be gravity fed. In other aspects, the pre-foam mixture 200 may not be homogenous when fed from the first mixing vessel 805, and the mixture conduits 807, 811 may comprise inline mixing equipment, including static mixing equipment, such as helical or plate mixers for example and without limitation, and/or dynamic mixing equipment, such as paddle or ribbon mixers for example and without limitation.

The foaming vessel 815 can receive the pre-foam mixture 200 and air from a compressed air source 813. The foaming vessel 815 can pass the pre-foam mixture 200 and air through foam generation media, as similarly discussed above with respect to FIG. 4, to produce foam 120. The foam 120 can be fed through a foam conduit 817 to a second mixing vessel 821. In some aspects, the foam conduit 817 can include a pump or compressor (not shown) to aid in transporting the foam 120 to the second mixing vessel 821, similar to the pump 809.

In the second mixing vessel 821, cellulose 110 can be fed from a storage vessel 819 into the second mixing vessel 821 to be mixed with the foam 120. In some aspects, the second mixing vessel 821 can be a dynamic mixing vessel 821 that can mix the cellulose 110 and foam 120 to create a homogenous uncured composite material 100, which can then be fed through a curing and a shaping process 825, 829. In some aspects, the cellulose 110 can be mixed with the foam 120 in several stages, such as with multiple mixing vessels, a combination of various static and dynamic mixers, a combination of mixing vessels and inline mixers, or multiple inline mixers, for example and without limitation. For example, the uncured composite material 100 can be fed through a composite conduit (not shown), which can include static or dynamic inline mixers, as similarly discussed with respect to mixture conduits 807, 811 and pump 809.

The uncured composite material 100 can be transported through the curing and shaping processes 825, 829, such as with a conveyor 823 for example and without limitation. In other aspects, the uncured composite material 100 can be both shaped and cured in a combined process, such as by directly extruding particles of the composite material 100 into a curing oven or dryer, for example and without limitation.

As discussed above, the curing and shaping processes 825, 829 can occur in either order. For example, in some aspects, element 825 can represent the shaping process, which can be accomplished by depositing the uncured composite material 100 into molds 700 that can be fed by the conveyor 823 through one or more curing processes 829, and possibly additional shaping processes (not shown), such as finishing the cured composite material 100 after removal from the molds 700.

In some aspects, the uncured composite material 100 can be directly deposited to the conveyor 823, and element 825 can represent the curing process, which can cure the composite material 100 as it passes through on the conveyor 823. A second portion of the conveyor 827 or a separate conveyer 827 can then carry the unshaped cured composite material 100 through to element 829, which can represent the shaping process 829, and finished or semi-finished products can be fed out by a third part of the conveyor 831, or a third conveyor, after being shaped.

FIG. 9 is a process schematic illustrating another aspect of an industrial process for producing the composite material 100 in accordance with another aspect of the present disclosure.

In the aspect shown, the process can comprise a pair of foam generation tanks 915*a, b*. Various material streams 901*a-d* can be fed into each of the foam generation tanks 915*a, b*. Though four material streams 901*a-d* are shown, this number should not be viewed as limiting. Greater or fewer than four material streams 901*a-d* can be fed into the foam generation tanks 915*a, b*, and each material stream 901*a-d* can carry a single material or mixture of materials in various aspects. The material streams 901*a-d* can supply the ingredients of the pre-foam mixture 200. In the present aspect, the material streams 901*a-d* can supply at least water, a glue (such as PVA for example and without limitation), xanthan gum, and sodium laureth sulfate. In some aspects, sodium coco sulfate can be utilized in addition or in place of sodium laureth sulfate. In some aspects, the material streams 901*a-d* can further supply hydroxypropyl methyl cellulose, methyl cellulose, and/or ethyl cellulose to the foam generation tanks 915*a, b*. In various aspects, the material streams 901*a-d* can carry any of the recipes, formulations, individual ingredients, or combinations thereof disclosed herein to the foam generation tanks 915*a, b*. The foam 120 can be generated in the foam generation tanks 915*a, b*.

The foam generations tanks 915*a, b* can be connected to a three-way valve 916. A mixer 921, such as a screw mixer or any other suitable type of mixer, can be connected to the three-way valve 916 downstream from the foam generations tanks 915*a, b*. The foam generations tanks 915*a, b* can be operated on a shift, or batch, basis, and the three-way valve 916 can be operated to alternately connect the separate foam generation tanks 915*a, b* in communication with the mixer 921, such that the mixer 921 and remainder of the process can be operated continuously. For example, foam generation tank 915*a* can supply the foam 120 to the mixer 921 while the foam generation tank 915*b* is being cleaned and a new batch of foam 120 is being formed within foam generation tank 915*b*. Once foam generation tank 915*a* is low or out of foam 120, the three-way valve 916 can be switched to supply from foam generation tank 915*b* to the mixer 921, and the process can be repeated indefinitely for continuous operation.

Cellulose 110, such as cellulose fiber 112, can be fed as a material stream 919 to a fiber shredder 920. In some aspects, the cellulose 110 can be a waste stream, such as trimmings from a paper mill or other pulp-based manufacturing facility. In some aspects, the waste stream can be from another facility, such as a saw mill for example and without limitation. In some aspects, the cellulose 110 can originate from another source, such as a recycling facility or garbage dump. The fiber shredder 920 can process the cellulose 110 into a desired shape, size, and form of cellulose fiber 112, which can be fed into the mixer 921 to be mixed with the foam 120 to form the composite material 100, in an uncured state.

The mixer 921 can supply the uncured composite material 100 to a slurry dispensing unit 922, which can deposit the uncured composite material 100 to a curing conveyor 923. The curing conveyor 923 can pass the composite material 100 under at least one curing unit 925*a, b*. In some aspects, the curing conveyor 923 can extend through a tunnel. In the present aspect, one or both of the curing units 925*a, b* can be microwave heaters; however, any other type of heaters or dryers can be suitable, such as infrared, ultrasonic, or air dryers for example and without limitation.

In some aspects, the at least one curing unit 925*a, b* can operate as a two-stage curing step. For example and without limitation, a first curing unit 925*a* of the at least one curing unit 925*a, b* can operate at a lower power setting, which can set the uncured composite material 100 into shape. For example the first curing unit 925*a* can heat the uncured composite material 100 until it hardens, without heating distorting the uncured composite material 100 such as through excessive foam generation due to overheating. Once the composite material 100 has set and begun to harden, a second curing unit 925*b* of the at least one curing unit 925*a, b* can operate at a higher power setting to fully dry the composite material 100.

In some aspects, the curing conveyor 923 can comprise a mesh web. The curing conveyor 923 can operate at a speed of about 10-30 linear feet per minute. In some aspects, the curing conveyor 923 can operate at a speed of about 15-20 linear feet per minute. In some aspects, the curing conveyor 923 can operate at a speed of about 18 linear feet per minute. The curing conveyor 923 can define any width; however, as one non-limiting example, an aspect of the curing conveyor 923 with an 8-foot-wide web operating at 18 linear feet per minute produces 144 ft$^2$ per minute.

In some aspects, the curing conveyor 923 can carry a plurality of molds, which can receive and roughly shape the uncured composite material 100 as the material is cured. The molds can create basic shapes, such as rectangular sheets for example and without limitation, or more intricate shapes, such as the rough shape of various parts, brackets, components, etc. In some aspects, the molds can be attached to a web of the curing conveyor 923. In some aspects, the molds can be built into the web. The web of the curing conveyor 923 can comprise fabric, screen (such as a fiberglass screen for example and without limitation), polymers, such as polypropylene for example and without limitation, or other suitable materials.

After curing, a drying conveyor 927 can carry the composite material 100 through an air dryer 926. The air dryer 926 can further extract any residual moisture from the composite material 100.

After final drying, the composite material 100 can pass through a laminator 928 and a shaping stage 929. The order of these steps should not be viewed as limiting. The composite material 100 can be shaped and then laminated or laminated and then shaped. In some aspects, the composite material 100 can be shaped, laminated, and subjected to additional shaping or finishing steps. In the present aspect, the laminator 928 can laminate the composite material 100 with a film, such as paper, plastic, or another suitable material. The film can be applied to one side or both sides, and the film can partially or fully encapsulate the composite material 100. In some aspects, the laminator 928 can deposit a spray, which can form a coating around some or all of the composite material 100. In some aspects, the coating can encapsulate the material. In some aspects, the coating can be provided to reduce dust and loose material from falling off the composite material 100. In some aspects, the coating can strengthen the composite material 100. The spray can include glues, lacquers, acrylics, paints, or other suitable materials. In some aspects, thinned PVA glue can be sprayed onto the composite material 100, such as before, after, or in lieu of lamination by film.

The shaping stage 929 can cut the composite material 100 into smaller pieces or shapes. For example and without limitation, the shaping stage 929 can comprise an in-line sheet cutter, which can cut the composite material 100 into smaller sheets 931. The sheets 931 can ultimately be converted into other products, such as A-B, or C-shaped, insulation liners, boxes, bags, panels, boards, and other finished or semi-finished products. A sheet stacker 930 can stack the sheets 931 as they come off of the manufacturing line. In some aspects, the shaping stage 929 can shape the composite material 100 into finished pieces. For example and without limitation, the composite material 100 can be cut to finished lengths and widths to produce smaller finished pieces, rather than producing larger sheets and converting them to finished pieces in a separate operation.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A composite comprising:
   cellulose fiber; and
   a water-based foam binding the cellulose fiber, wherein the cellulose fiber defines a density of less than 1,450 grams per square meter (GSM), an average pore diameter is about 1-2 mm, and a maximum pore diameter within the water-based foam is about 3 mm.

2. The composite of claim 1, wherein the composite is formed into an insulation batt.

3. The composite of claim 1, wherein the water-based foam comprises polyvinyl acetate, sodium coco sulfate, xantham gum, and hydroxypropyl methyl cellulose.

4. The composite of claim 1, wherein the water-based foam comprises starch, liquid egg whites, polyvinyl acetate, baking soda, and citric acid.

5. The composite of claim 1, wherein the cellulose fiber comprises edge trim.

6. The composite of claim 1, wherein the composite defines a density of about 0.15-0.20 g/ml prior to curing.

7. The composite of claim 1, wherein a length of each cellulose fiber exceeds one foot (12 inches) in length.

8. The composite of claim 1, wherein a length of each cellulose fiber exceeds one yard (36 inches) in length.

9. The composite of claim 1, wherein the composite comprises a 0.75:1 ratio by weight of a PVA to the cellulose fiber.

10. A composite comprising:
a cellulose fiber; and
a foam defining a density of less than 1,450 grams per square meter (GSM), an average pore diameter between 1-2 mm, and comprising a maximum pore diameter of 3 mm, the foam binding the cellulose fiber.

11. The composite of claim 10, wherein the cellulose fiber is a recycled fiber derived from recycled paper and cardboard products.

12. The composite of claim 10, wherein the cellulose fiber comprises edge trim from a paper mill.

13. The composite of claim 10, wherein the cellulose fiber comprises saw dust.

14. The composite of claim 1, wherein the composite has a structural strength of plywood and the composite is suitable for machining.

15. The composite of claim 10, wherein the composite forms a structural component of a cabinet.

16. The composite of claim 10, wherein the composite is non-toxic.

17. The composite of claim 10, wherein the composite is single-stream recyclable and repulpable.

* * * * *